United States Patent
Chalker, II et al.

(10) Patent No.: US 6,527,498 B2
(45) Date of Patent: Mar. 4, 2003

(54) APPARATUS AND METHOD FOR REORIENTING AN EGG BETWEEN VERTICAL AND HORIZONTAL ORIENTATIONS

(75) Inventors: B. Alan Chalker, II, Durham, NC (US); Johnny Mark Townsend, Laurens; Edward Atkinson Pomeroy, III, Easley, both of SC (US)

(73) Assignee: Embrex, Inc., Research Triangle Park, NC (US)

( * ) Notice: Subject to any disclaimer, the term of this patent is extended or adjusted under 35 U.S.C. 154(b) by 107 days.

(21) Appl. No.: 09/835,990

(22) Filed: Apr. 17, 2001

(65) Prior Publication Data

US 2002/0150460 A1 Oct. 17, 2002

(51) Int. Cl.$^7$ ............................................... A01K 29/10
(52) U.S. Cl. ........................ 414/754; 414/757; 414/775; 414/781; 414/784; 119/6.5; 119/6.6; 119/6.8
(58) Field of Search ................................ 414/754, 757, 414/775, 781, 784; 119/1, 6.5, 6.6, 6.8

(56) References Cited

U.S. PATENT DOCUMENTS

| | | | |
|---|---|---|---|
| 4,458,630 A | | 7/1984 | Sharma et al. |
| 4,681,063 A | * | 7/1987 | Hebrank ..................... 119/1 |
| 5,028,421 A | | 7/1991 | Fredericksen et al. |
| 5,136,979 A | | 8/1992 | Paul et al. |
| 5,158,038 A | | 10/1992 | Sheeks et al. |
| 5,699,751 A | | 12/1997 | Phelps et al. |
| 6,145,668 A | | 11/2000 | DePauw et al. |
| 6,149,375 A | | 11/2000 | Hebrank |
| 6,176,199 B1 | * | 1/2001 | Gore et al. ................... 119/6.8 |
| 6,196,160 B1 | | 3/2001 | Pas ............................. 119/322 |

OTHER PUBLICATIONS

International Search Report, PCT/US02/07229, Jun. 28, 2002.

* cited by examiner

Primary Examiner—Eileen D. Lillis
Assistant Examiner—Michael Lowe
(74) Attorney, Agent, or Firm—Myers Bigel Sibley & Sajovec

(57) ABSTRACT

Apparatus for repositioning eggs from a generally vertical position to a generally horizontal position such that injection/removal of material into/from the side of the egg can occur. Each apparatus may include a cradle, an alignment member, and an orientation member. The cradle has an inclined, arcuate surface with an upper portion, a lower portion, and opposite side portions. The alignment member is operably positioned adjacent the cradle and is configured to engage an egg positioned on the arcuate surface lower portion in an inclined orientation and to releasably secure the egg in a predetermined alignment relative to the cradle. The orientation member is operably positioned relative to the cradle, and is configured to urge an egg positioned on the lower portion in an inclined orientation to a generally vertical orientation after injection/removal of material into/from the egg has occurred.

26 Claims, 20 Drawing Sheets

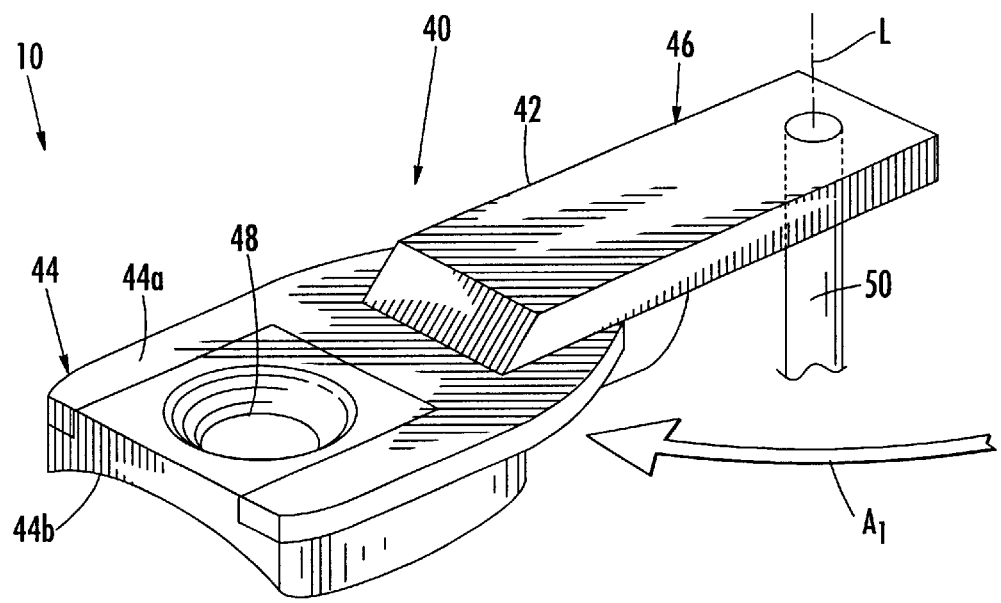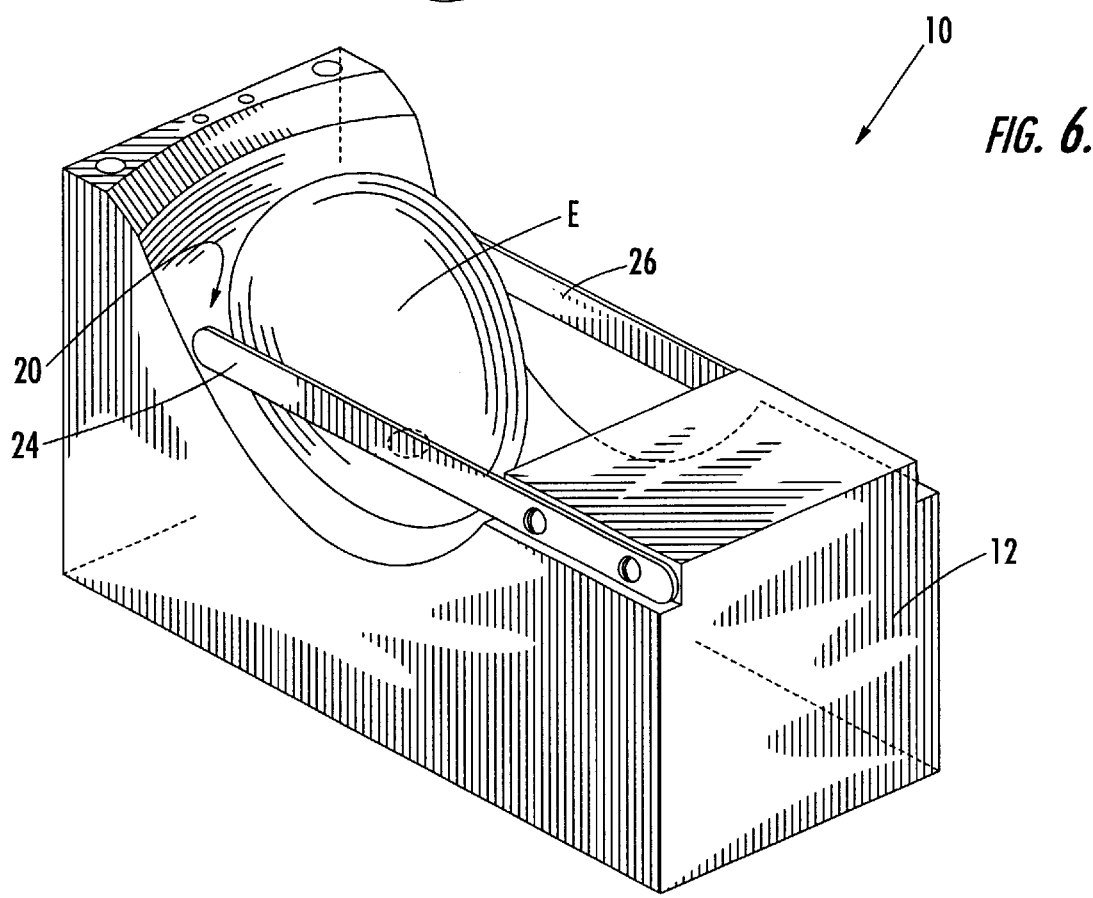
FIG. 6.

APPARATUS AND METHOD FOR REORIENTING AN EGG BETWEEN VERTICAL AND HORIZONTAL ORIENTATIONS

FIELD OF THE INVENTION

The present invention relates generally to eggs and, more particularly, to devices for handling eggs.

BACKGROUND OF THE INVENTION

Injections of various substances into avian eggs have been employed to decrease post-hatch mortality rates, increase the potential growth rates or eventual size of the resulting chicken, and even to influence the gender determination of the embryo. Similarly, injections of antigens into live eggs have been employed to incubate various substances used in vaccines which have human or animal medicinal or diagnostic applications. Examples of substances that have been used for, or proposed for, in ovo injection include vaccines, antibiotics and vitamins. In addition, removal of material from avian eggs has been employed for various purposes, such as testing and vaccine harvesting.

Examples of in ovo treatment substances and methods of in ovo injection are described in U.S. Pat. No. 4,458,630 to Sharma et al. and U.S. Pat. No. 5,028,421 to Fredericksen et al., the contents of which are incorporated by reference herein in their entireties. The selection of both the site and time of injection treatment can also impact the effectiveness of the injected substance, as well as the mortality rate of the injected eggs or treated embryos. See, e.g., U.S. Pat. No. 4,458,630 to Sharma et al., U.S. Pat. No. 4,681,063 to Hebrank, and U.S. Pat. No. 5,158,038 to Sheeks et al., each of which is hereby incorporated by reference herein in its entirety.

Conventionally, devices for injecting eggs and for removing materials from eggs are configured to pierce and enter an egg along a generally vertical direction. Eggs are generally positioned in an upright, vertical orientation with the longitudinal axis of the egg substantially aligned with vertical. Conventional devices for injecting eggs and for removing materials from eggs may not be easily modifiable to permit injection/removal along a direction substantially different from vertical. Unfortunately, targeted portions of an egg may not be easily reached by conventional devices that are configured to enter an egg along a generally vertical direction.

SUMMARY OF THE INVENTION

In view of the above discussion, an apparatus for repositioning eggs from a vertical position to a horizontal position such that injection/removal of material into/from the side of the egg can occur is provided, and includes a cradle, an alignment member, and an orientation member. According to an embodiment of the present invention, the cradle has an inclined, arcuate surface with an upper portion, a lower portion, and opposite side portions. The arcuate surface upper portion is configured to receive an end of a generally vertically oriented egg and to cause the egg to slide toward the lower portion such that the egg is positioned on the lower portion in an inclined orientation. The alignment member is operably positioned adjacent the cradle and is configured to engage an egg positioned on the arcuate surface lower portion in an inclined orientation and to releasably secure the egg in a predetermined alignment relative to the cradle. The orientation member is operably positioned relative to the cradle, and is configured to urge an egg positioned on the lower portion in an inclined orientation to a generally vertical orientation after injection/removal of material into/from the egg has occurred.

In operation, an egg transfer device is configured to deliver a generally vertically oriented egg to the arcuate surface upper portion. The inclined configuration of the cradle arcuate surface causes the egg to slide downwardly to an inclined orientation on the arcuate surface lower portion. The alignment member is positioned in overlying, contacting relation with the egg, and movably secures the egg to a predetermined alignment relative to the cradle.

According to embodiments of the present invention, the alignment member has an aperture formed therethrough that is configured to receive one or more instruments extending from a device configured to inject material into an egg and/or to remove material from an egg. Accordingly, once the alignment member is in contacting relation with an egg, an injection/removal device is lowered downwardly toward the egg such that one or more instruments can be inserted through the aperture in the alignment member. After injecting material into the egg and/or removing material from the egg, the injection/removal device is raised upwardly away from the egg. The alignment member is then moved away from the egg.

Before the egg is removed from the cradle, the egg is repositioned to a generally vertical orientation via the orientation member, which extends upwardly from the cradle. According to embodiments of the present invention, the orientation member includes an elongated rod slidably positioned within the cradle and configured for reciprocal movement between retracted and extended positions. When moved to an extended position, the elongated rod extends upwardly and pushes against the egg to cause the egg to move to a generally vertical orientation (i.e., such that the egg is in a generally upright position on an end thereof). Once the egg is repositioned to a generally vertical orientation, a transfer device moves downwardly toward the upright egg, engages the egg, and removes the egg from the cradle.

According to embodiments of the present invention, a pair of spaced-apart retaining arms may be provided along the side portions of the cradle to help guide and/or stabilize an egg as it is urged to a generally vertical orientation by the orientation member. The retaining arms may also help prevent an egg from tipping to either side of the orientation member during operation thereof. The retaining arms also flex outwardly to accommodate large eggs, while at the same time providing support for narrow eggs. In addition, the retaining arms help to center an egg laterally on the cradle so that the long axis of the egg is aligned with the long axis of the cradle while the egg is in a generally horizontal position.

According to embodiments of the present invention, a method of reorienting an egg between generally vertical and generally horizontal orientations is provided. A generally vertically oriented egg is lowered such that an end thereof contacts an inclined surface. The egg is released so that it takes an inclined orientation in contact with the inclined surface. The egg is contacted with an alignment member that moves the egg from the inclined orientation to a generally horizontal orientation on a floor surface adjacent the inclined surface. After injection and/or removal of material from the egg, or after some other processing is performed on the egg, the alignment member is removed from contacting relation with the egg. The egg in the generally horizontal orientation is then contacted with an orientation member that urges the egg to a generally vertical orientation.

According to alternative embodiments of the present invention, an apparatus for reorienting an egg from a generally vertical orientation to a generally horizontal orientation includes a cradle having a first portion, and an adjacent, spaced-apart second portion. The first portion includes a pair of opposite, spaced-apart members with inclined upper ends. The second portion includes a pair of opposite, spaced-apart members with inclined upper ends. The inclined upper ends of the first portion are configured to receive an end of a vertically oriented egg and to cause the egg to slide downwardly such that the egg becomes positioned on the upper ends of the first and second portions in a generally inclined orientation. The second portion is configured for reciprocal movement between a retracted position and an extended position, and is configured to urge an egg positioned on the upper ends of the first and second portions to a generally vertical orientation when the second portion is moved to the extended position.

Embodiments of the present invention may be advantageous because eggs can be repositioned from a vertical orientation to a horizontal (or other inclined) orientation, and then returned to a vertical orientation, quickly and easily. As such, certain targeted areas within an egg may be reached with greater accuracy and efficiency. Moreover, conventional injection/removal devices and systems may be easily adapted to incorporate embodiments of the present invention. In addition, embodiments of the present invention may be advantageous because the air cell within an egg can be maintained at the "top" or "upper" portion of an egg as the egg is repositioned from a generally vertical orientation to a horizontal (or other inclined) orientation, and then returned to a generally vertical orientation.

BRIEF DESCRIPTION OF THE DRAWINGS

FIGS. 6–8 are perspective views of the egg positioning apparatus of FIG. 1 illustrating an alignment member being moved into place to engage an egg placed within the apparatus.

DETAILED DESCRIPTION OF THE INVENTION

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
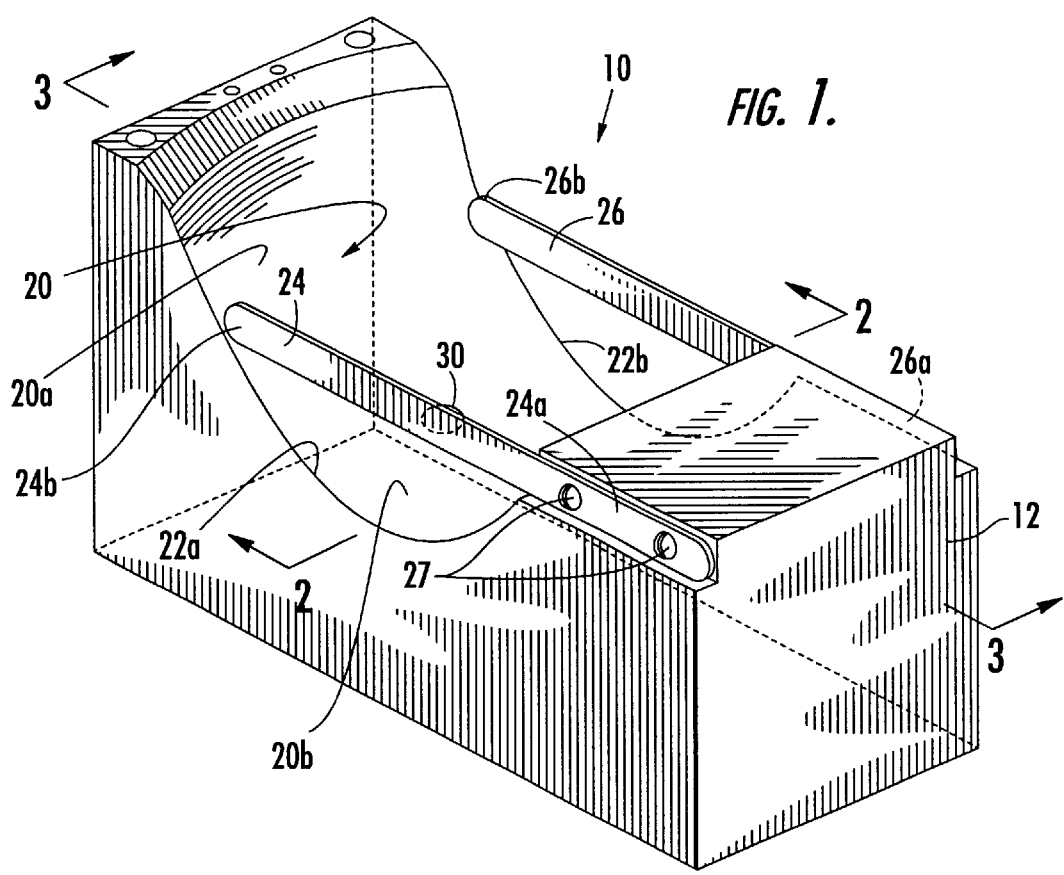
FIG. 1 is a perspective view of an egg positioning apparatus, according to embodiments of the present invention.

Referring now to FIG. 1, an egg positioning apparatus 10 that is configured to reposition an egg from a vertically oriented position to a horizontal position and then back to a vertically oriented position, according to embodiments of the present invention, is illustrated. The illustrated apparatus 10 includes a cradle 12 having an inclined, arcuate surface 20 that defines a receptacle for receiving an egg. The illustrated arcuate surface 20 has an inclined upper portion 20a, a lower portion (or floor) 20b, and opposite side portions 22a, 22b. The arcuate surface 20 may be a substantially smooth, continuous arcuate surface. Alternatively, the arcuate surface 20 may include a plurality of flat, adjacent surfaces arranged so as to form a generally arcuate configuration. It is understood that the arcuate surface 20 may have various shapes and configurations and is not limited to the illustrated embodiments.

Figure 2:
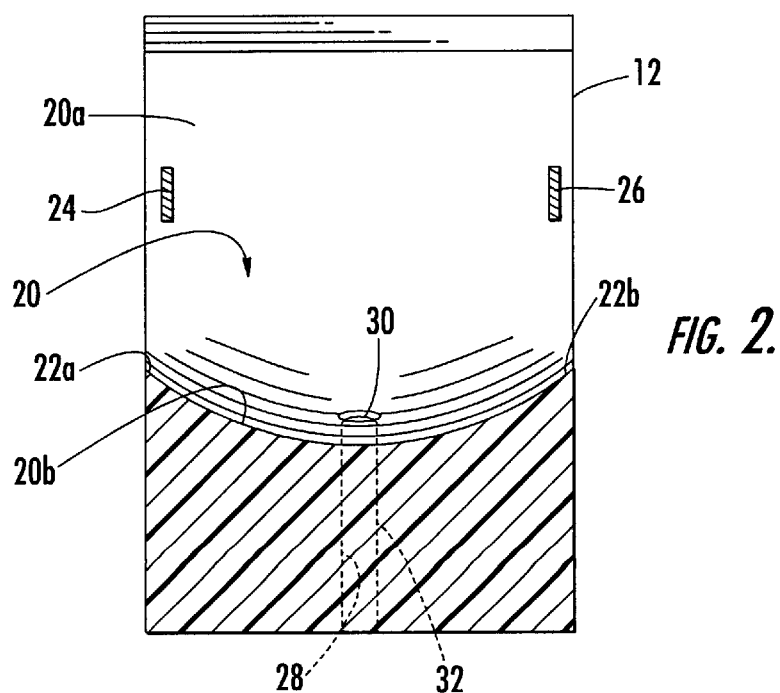
FIG. 2 is a section view of the egg positioning apparatus of FIG. 1 taken along lines 2—2.

As illustrated in FIG. 2, the cradle arcuate surface 20 has a generally concave configuration between opposite side portions 22a, 22b. The generally concave configuration of the arcuate surface 20 helps maintain an egg in a generally centered position on the arcuate surface 20, as will be described below. The arcuate surface upper portion 20a is configured to receive an end of a vertically oriented egg and to cause the egg to slide to the arcuate surface lower portion 20b such that the egg becomes positioned on the arcuate surface lower portion 20b in a generally inclined orientation, as will be described below.

Embodiments of the present invention are not limited to the illustrated cradle 12 or to the illustrated configuration of the arcuate surface 20. Cradles having various configurations and shapes may be utilized. Moreover, the cradle arcuate surface 20 may have various configurations. For example, the cradle arcuate surface may have a generally flat configuration between opposite side portions 22a, 22b.

A pair of elongated retaining arms 24, 26 are secured to the cradle 12 in spaced-apart relation along the respective arcuate surface side portions 22a, 22b, as illustrated. Each of the illustrated elongated arms 24, 26 has a respective end 24a, 26a that is secured to the cradle 12 via fasteners 27 and an opposite free end 24b, 26b. Fasteners 27 may be various known fastening devices including, but not limited to, threaded fasteners (e.g., screws, bolts, etc.) and unthreaded fasteners (e.g., rivets, tapered studs, untapered studs, etc.). Alternatively, retaining arms 24, 26 may be adhesively secured to the cradle, or secured to the cradle 12 via welding, brazing, soldering, or various other known methods.

The retaining arms 24, 26 help to prevent an egg from rolling or falling off of the cradle arcuate surface 20. Moreover, the retaining arms 24, 26 help stabilize an egg that is being repositioned from a generally horizontal position to a generally vertical position, as described below. The retaining arms 24, 26 also flex outwardly to accommodate large eggs, while at the same time providing support for narrow eggs. In addition, the retaining arms 24, 26 help to center an egg laterally on the cradle arcuate surface 20 so that the long axis of the egg is aligned with the long axis of the cradle while the egg is in a generally horizontal position.

Embodiments of the present invention are not limited to the illustrated retaining arms 24, 26. Retaining arms may have various configurations and may be attached to the cradle 12 in various locations and configurations. Moreover, embodiments of the present invention may not require retaining arms.

Figure 3:
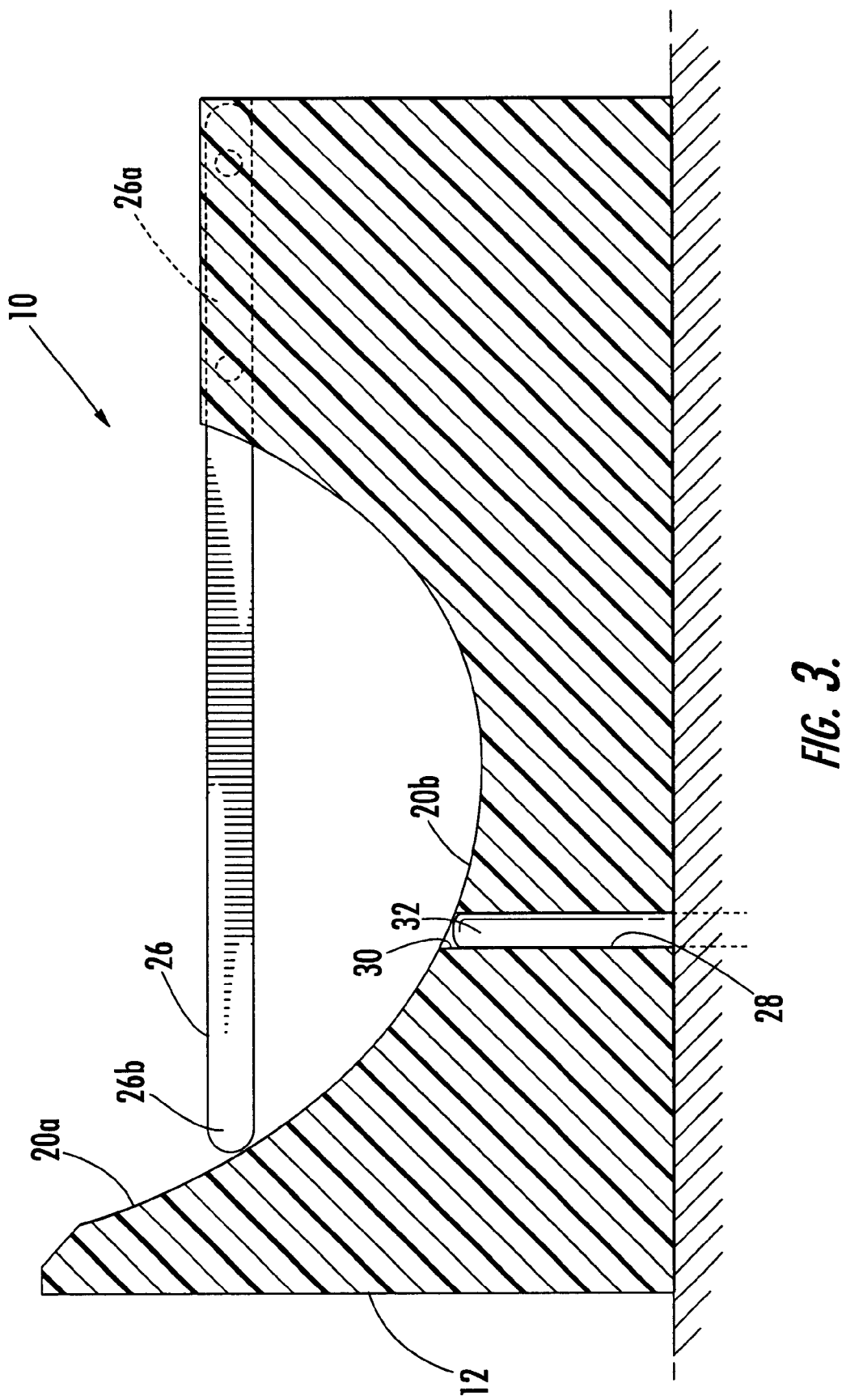
FIG. 3 is a section view of the egg positioning apparatus of FIG. 1 taken along lines 3—3.
Figure 18:
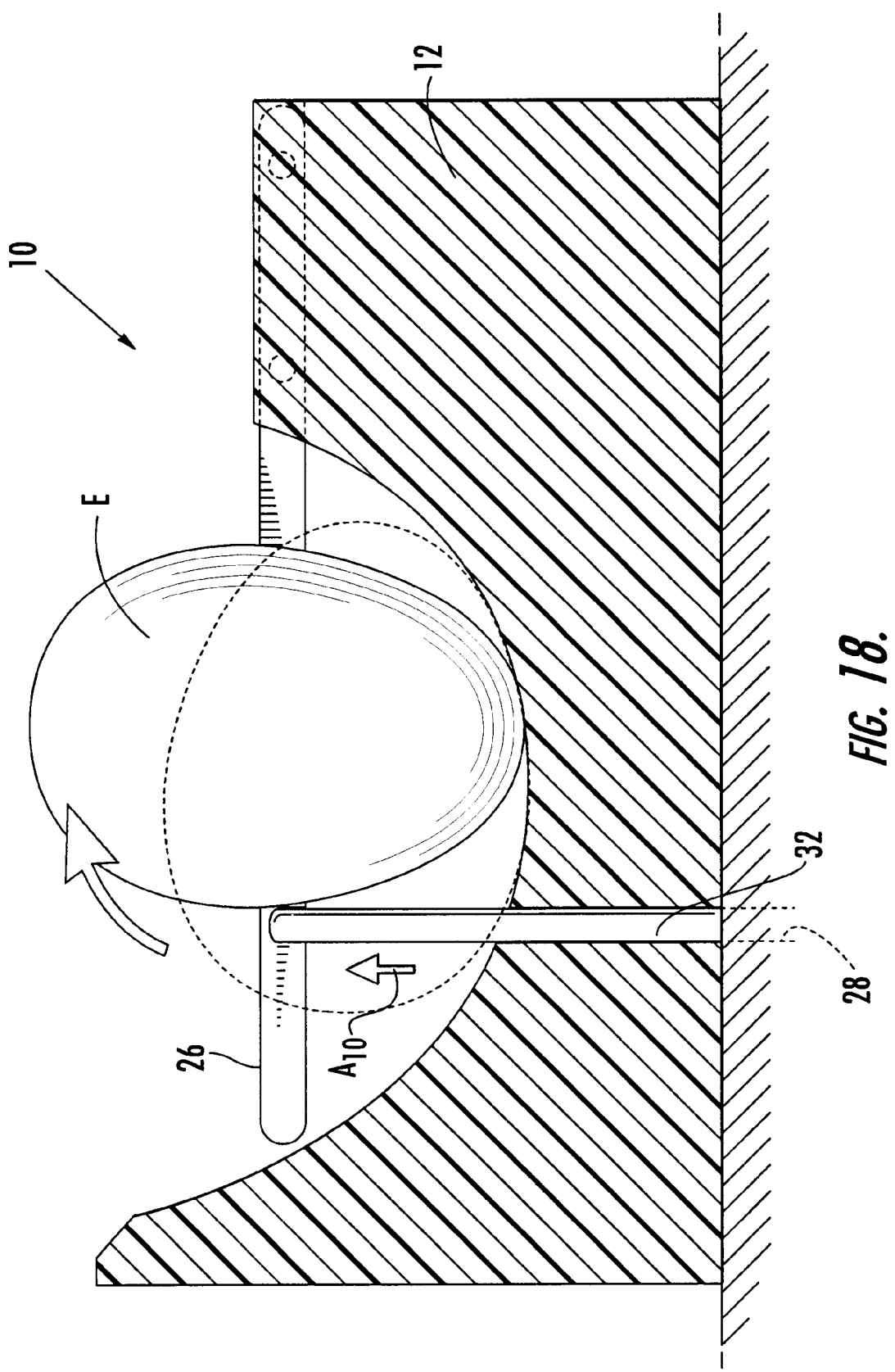
FIG. 18 is a section view of the egg positioning apparatus of FIG. 17 taken along lines 18—18.

A passageway 28 extends through the cradle 12 and terminates at aperture 30 in the arcuate surface lower portion 20b. An elongated rod 32, which serves as an orientation member, is positioned within the passageway 28 and is configured for reciprocal movement between a retracted position (FIG. 3) and an extended position (FIG. 18). In an extended position, the elongated rod 32 urges an egg horizontally positioned (or otherwise inclined relative to vertical) on the arcuate surface lower portion 20b to a vertical orientation, as will be described below.

Embodiments of the present invention are not limited to the illustrated elongated rod 32 or to the orientation of the elongated rod 32 with respect to the cradle 12. An orientation member may have various configurations and may be positioned within the cradle 12 for reciprocal movement between retracted and extended positions in various ways and in various orientations.

The illustrated elongated rod 32 is controlled by an actuator (not shown) which moves the elongated rod 32 between retracted and extended positions. Various types of actuators may be utilized to move the elongated rod 32 between retracted and extended positions, as would be understood by those skilled in the art. For example, pneumatic, hydraulic, magnetic, and electromechanical actuators may be utilized.

Referring now to FIG. 6, an alignment member 40 is positioned adjacent the cradle 12 and is operably associated with the cradle 12. The alignment member 40 is configured to engage an egg E positioned on the arcuate surface lower portion 20b in an inclined orientation and to releasably secure the egg E in a predetermined alignment relative to the cradle 12, as will be described below.

The illustrated alignment member 40 includes an arm 42 having distal and proximal portions 44, 46. Alignment member distal portion 44 has an upper surface 44a, and an opposite lower surface 44b, as illustrated. The lower surface 44b has an arcuate configuration that is adapted for engagement with an egg in an inclined orientation, as will be described below. An aperture 48 is formed through the alignment member distal portion 44 as illustrated. The aperture 48 is configured to allow an instrument to pass therethrough for insertion within an egg that is secured within the cradle 12 by the alignment member 40.

Embodiments of the present invention are not limited to the illustrated alignment member 40. Alignment members having various configurations may be utilized in accordance with embodiments of the present invention. For example, the lower surface 44b of the distal portion 44 may have various configurations. Embodiments of the present invention do not require that the lower surface 44b of the distal portion 44 have an arcuate configuration.

Figure 12:
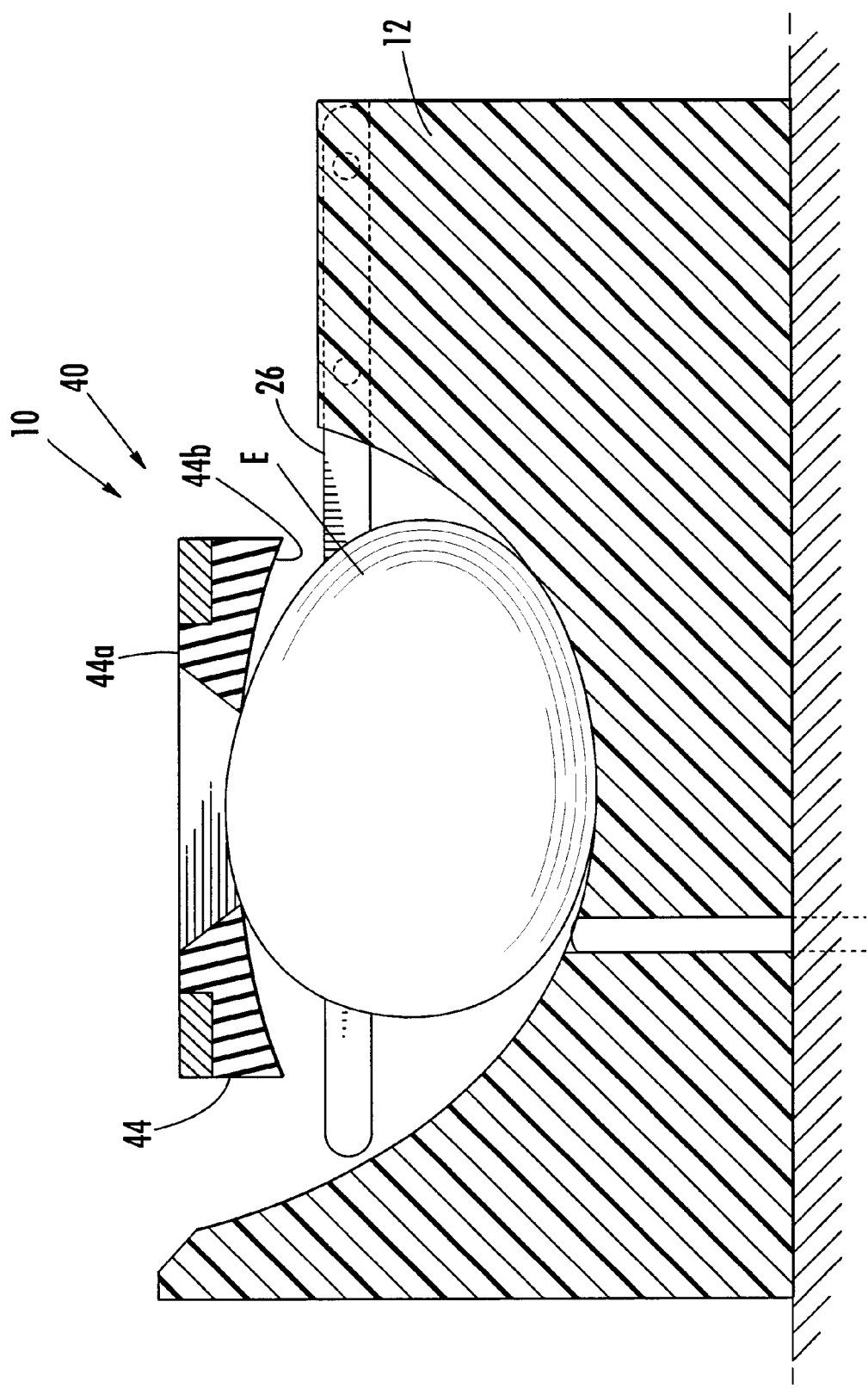
FIG. 12 is a section view of the egg positioning apparatus of FIG. 8 taken along lines 12—12.

In the illustrated embodiment, the alignment member distal portion 44 has a generally horizontal orientation when in engagement with an egg (see FIG. 12). However, it is preferable that the alignment member distal portion 44 can be adjusted to various angles relative to horizontal such that an egg can be secured within the cradle 12 at various angles relative to horizontal.

Figure 7:
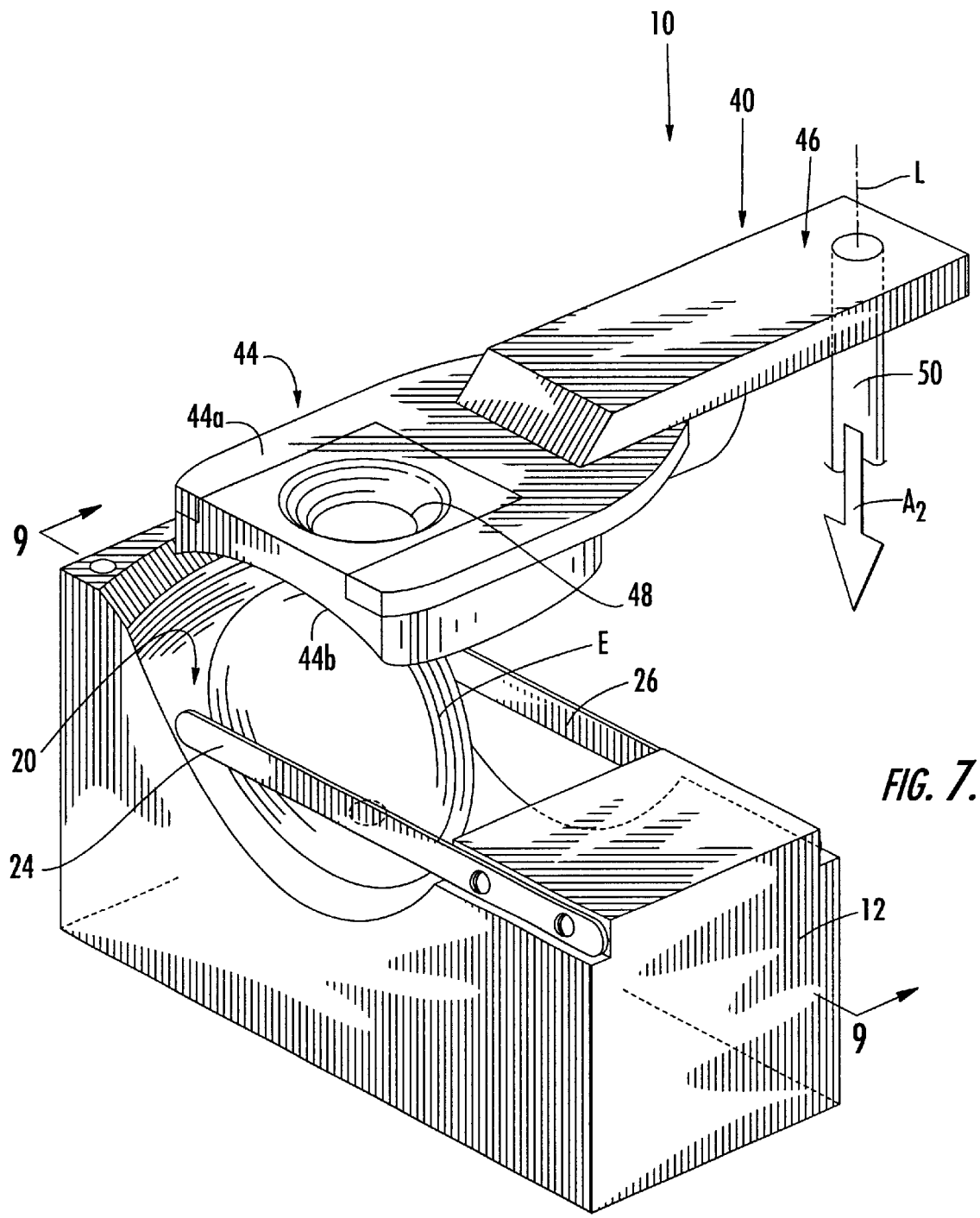

The alignment member proximal portion 46 is secured to support 50, as illustrated. Support 50 is configured to rotate axially about longitudinal axis L, and is also configured to reciprocally translate up and down along longitudinal axis L. As such, rotation of the support 50 about longitudinal axis L causes alignment member 40 to pivot about longitudinal axis L as indicated by arrow $A_1$ (FIG. 6). Moreover, movement of support 50 along longitudinal axis L raises and lowers alignment member 40 with respect to the cradle 12 as indicated by arrow $A_2$ (FIG. 7). As will be described below, when an egg is placed on the arcuate surface 20 of the cradle 12, the alignment member 40 is pivoted and lowered so as to engage the egg.

Movement of the support 50 (and, thus, alignment member 40) is controlled by an actuator (not shown). Various types of actuators may be utilized to move the alignment member 40, as would be understood by those skilled in the art. For example, pneumatic, hydraulic, magnetic, and electromechanical actuators may be utilized. It is understood that movement of the alignment member 40 is not limited to the illustrated movement (e.g., the movement illustrated in FIGS. 6–12 and FIGS. 15–16). Various series of movements may be utilized to move the alignment member 40 into, and out of, engagement with an egg.

Referring back to FIG. 4, an egg transfer device 60 is operably associated with the egg cradle 12 and is configured to deliver and remove eggs to and from the cradle 12. In the illustrated embodiment, the egg transfer device 60 includes a flexible cup 62 attached to a rod 64. Vacuum is supplied to the flexible cup via rod 64, which is in fluid communication with a vacuum source (not shown).

Movement of the rod 64 is controlled by an actuator (not shown) that is configured to move the rod 64 and flexible cup 62 so as to deposit an egg within the cradle 12 and to remove an egg from the cradle 12, as will be described below. Various types of actuators may be utilized to control movement of the egg transfer device 60, as would be understood by those skilled in the art. For example, pneumatic, hydraulic, magnetic, and electromechanical actuators may be utilized.

Exemplary egg transfer devices which may be utilized in accordance with embodiments of the present invention are described in U.S. Pat. Nos. 5,136,979, 6,149,375, and 6,145,668, which are incorporated herein by reference in their entireties. However, it is understood that various types and configurations of egg transfer devices may be utilized in accordance with embodiments of the present invention. The present invention is not limited to the illustrated egg transfer device 60.

Figure 4:
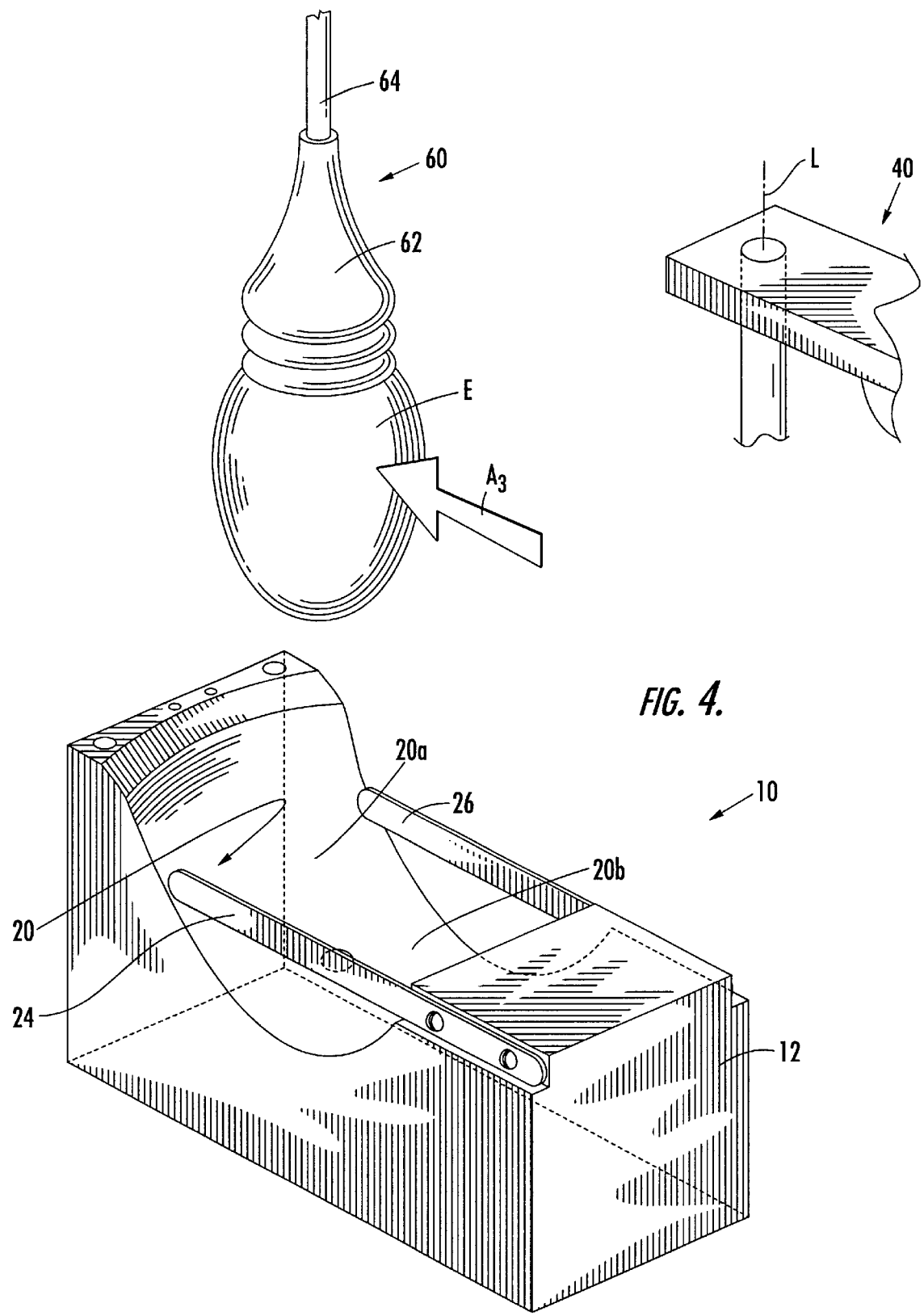
FIGS. 4–5 are perspective views of the egg positioning apparatus of FIG. 1 illustrating the placement of a generally vertically oriented egg therewithin.

Referring now to FIGS. 4–19, operation of the illustrated egg positioning apparatus 10 will now be described more fully. In FIG. 4, an egg E, is retained within the flexible cup 62 of the transfer device 60 in a vertically oriented position. The egg E is being moved via the egg transfer device 60 to a position overlying the cradle 12, as illustrated by arrow $A_3$. The alignment member 40 is rotated about longitudinal axis L of support 50 away from the cradle 12, as illustrated, so as not to interfere with the egg transfer device 60 and egg E retained therein.

Figure 5:
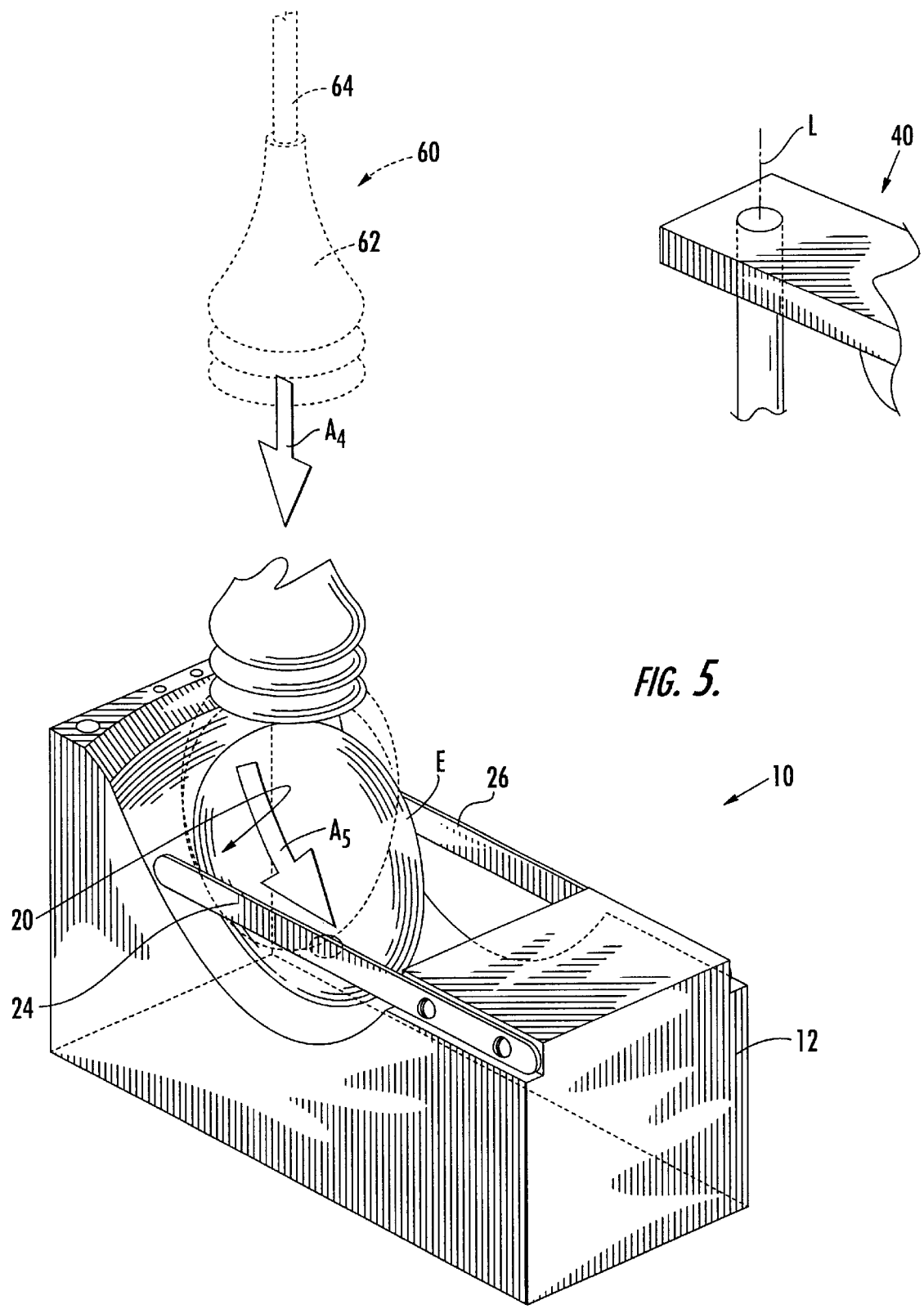
Figure 9:
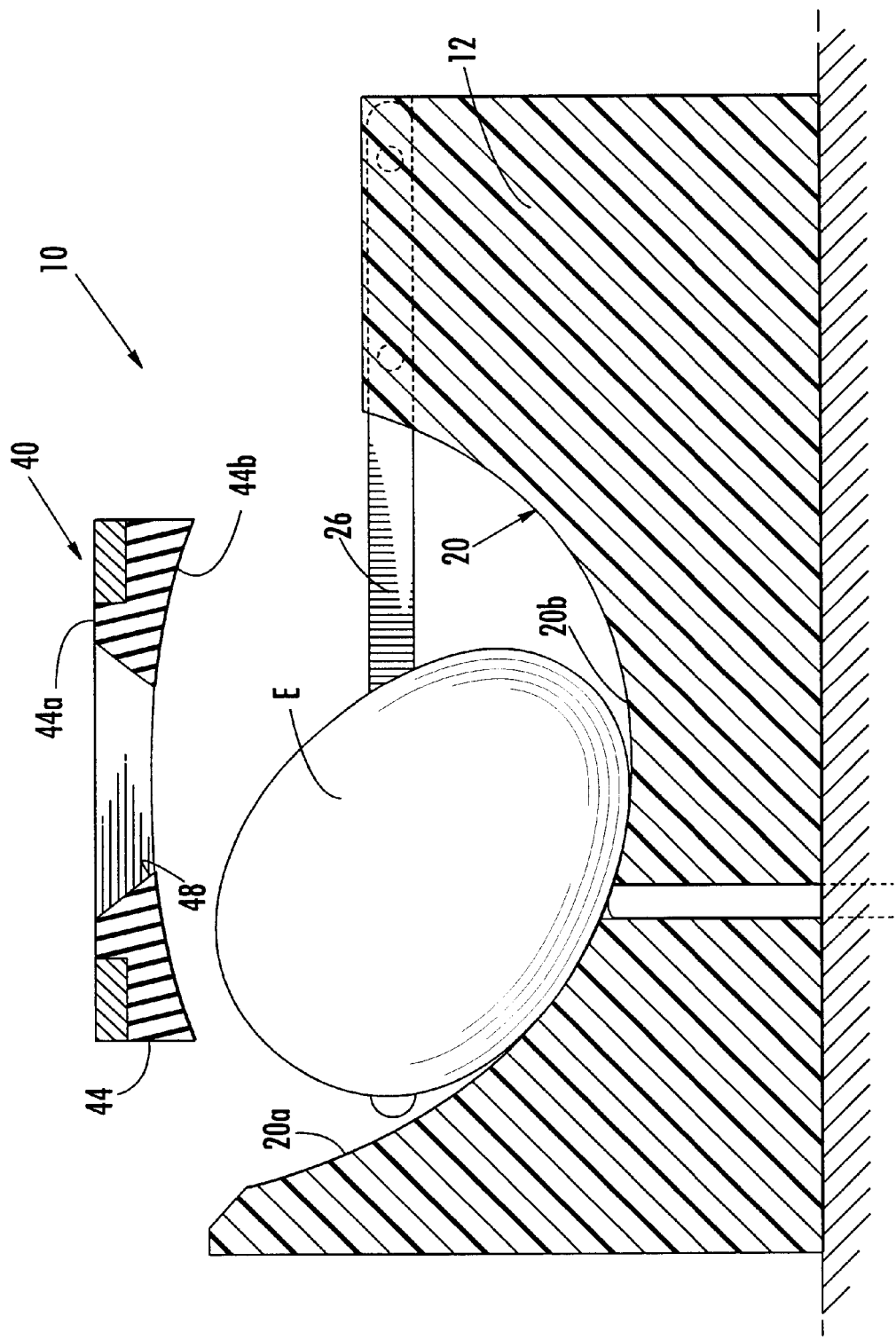
FIG. 9 is a side section view of the egg positioning apparatus of FIG. 7 taken along lines 9—9.

In FIG. 5, the transfer device 60 has moved downwardly (indicated by arrow $A_4$) toward the cradle 12, deposited egg E on the upper portion 20*a* of the arcuate surface 20, and returned. The inclined configuration of arcuate surface 20 causes the egg E to slide, as indicated by arrow $A_5$, to an inclined orientation on the arcuate surface lower portion 20*b*. FIG. 9 is a side view of the cradle 12 that illustrates the inclined orientation of egg E after being deposited on the arcuate surface upper portion 20*a* by transfer device 60. The egg E is centered on the arcuate surface 20 between the opposite side portions 22*a*, 22*b* as a result of the concave configuration of the arcuate surface 20 between the opposite side portions 22*a*, 22*b*.

Figure 8:
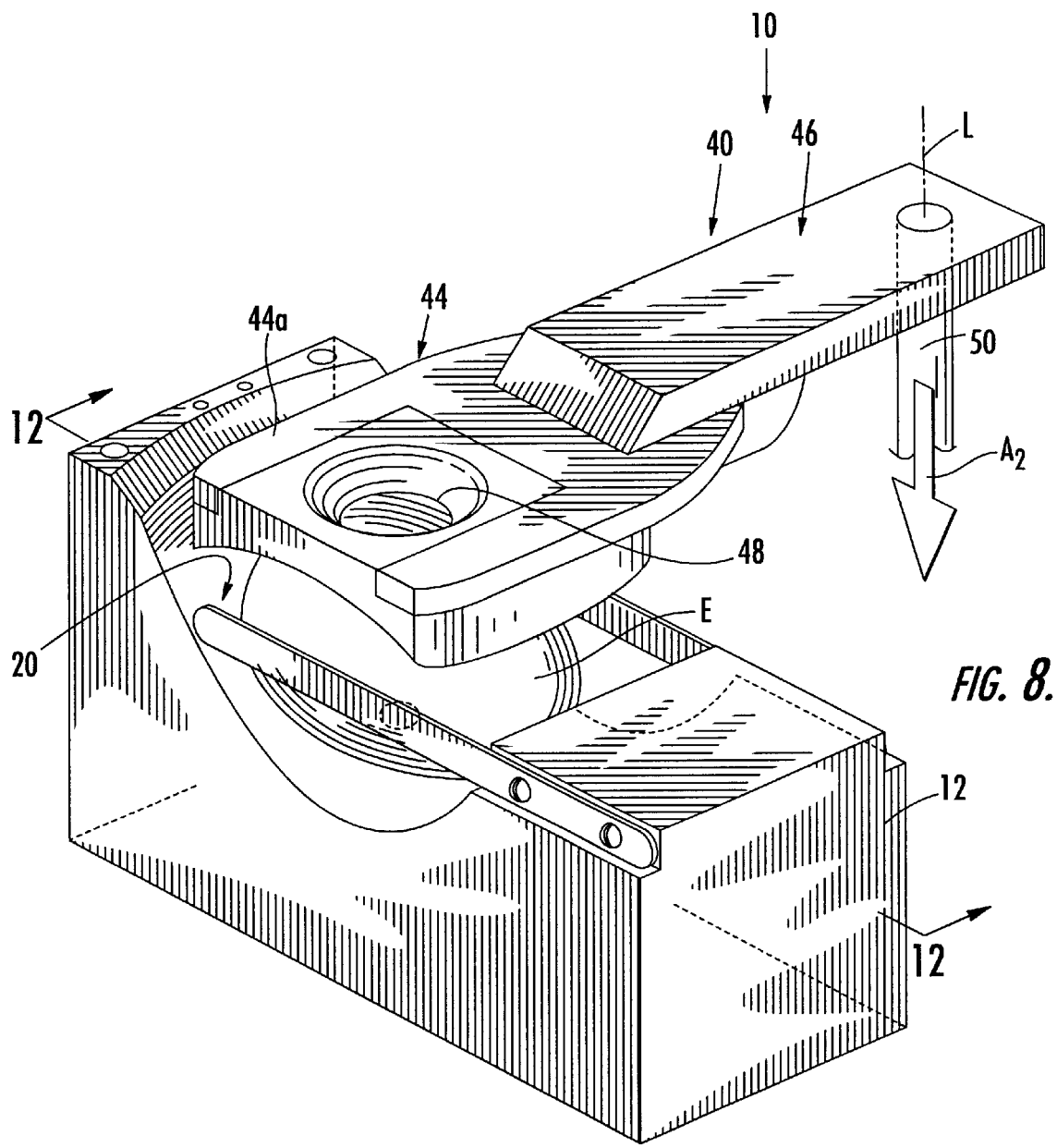

Referring now to FIGS. 6–8, movement of the alignment member 40 is illustrated. In FIG. 6, the alignment member 40 is pivoted (indicated by arrow $A_1$) about the longitudinal axis L such that the alignment member 40 overlies the inclined egg E. FIG. 7 illustrates downward movement (indicated by arrow $A_2$) of the alignment member 40 toward the inclined egg E. In FIG. 8, the alignment member 40 has engaged the inclined egg E and has movably secured the egg in a predetermined, generally horizontal, orientation within the cradle 12.

Figure 10:
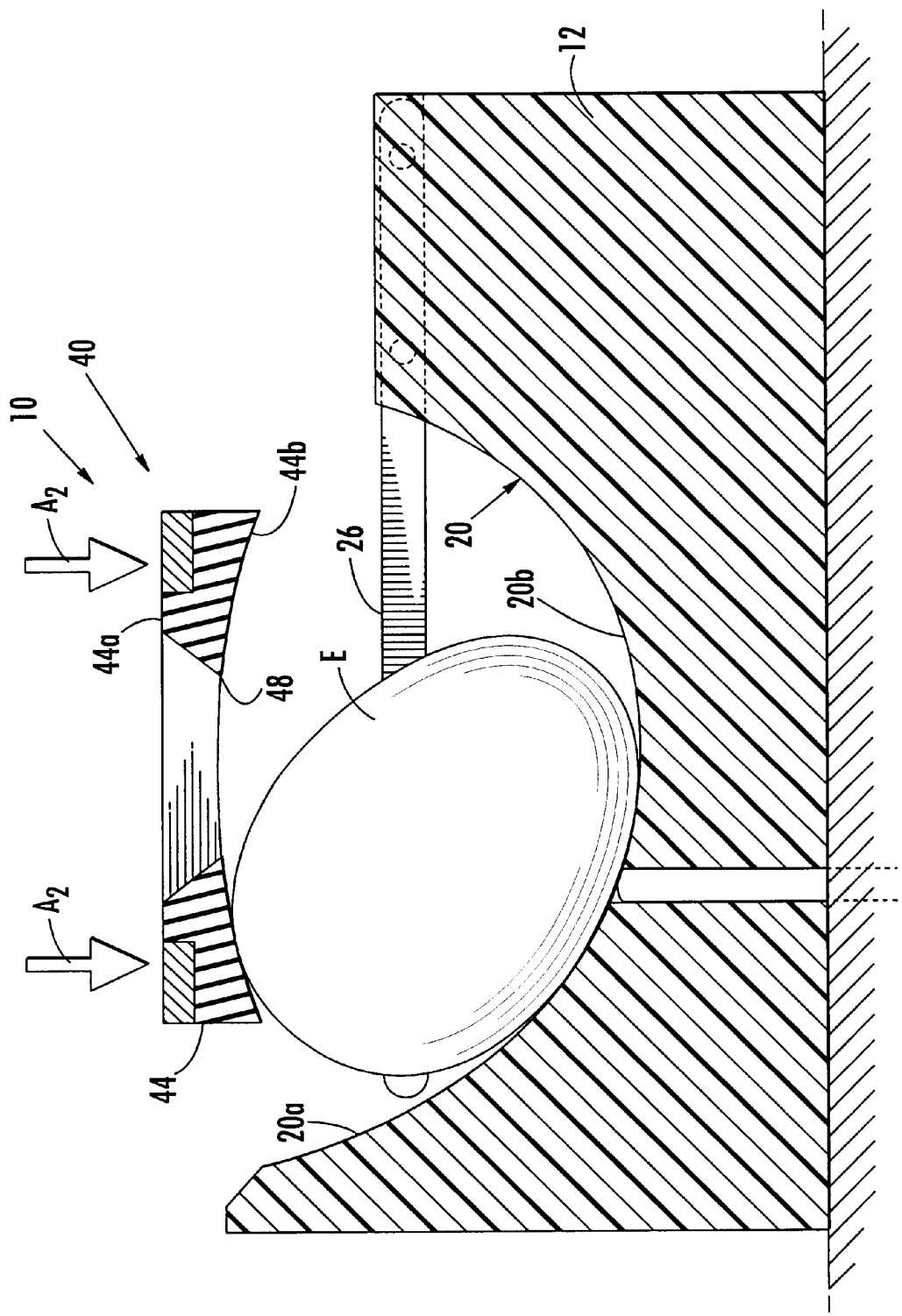
FIGS. 10–11 are side section views of the egg positioning apparatus of FIG. 7 illustrating contacting engagement of the alignment member with an egg within the apparatus.
Figure 11:
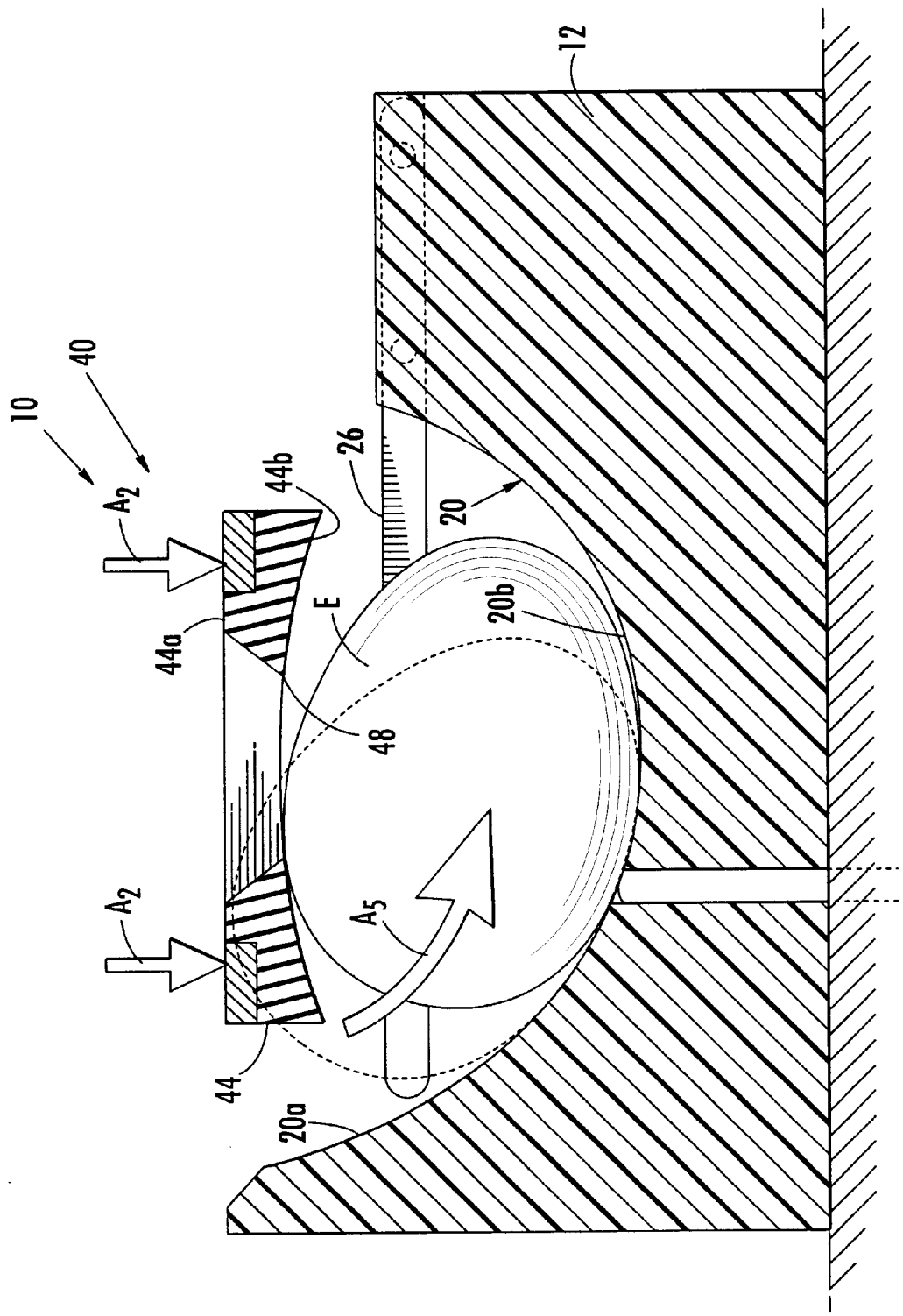

FIGS. 9–12 are side, section views of the egg positioning apparatus 10 that illustrate movement of the alignment member 40. In FIG. 9, the alignment member 40 has been positioned over an egg E which is in an inclined orientation on the arcuate surface 20. In FIG. 10, the alignment member 40 has moved downwardly (indicated by arrows $A_2$) and has initially made contact with the inclined egg E. In FIG. 11, the alignment member 40 has continued its downward movement (indicated by arrows $A_2$) and has begun to move (indicated by arrow $A_5$) the egg to a predetermined, generally horizontal orientation on the arcuate surface lower portion 20*b*, as illustrated in FIG. 12. The arcuate shape of the illustrated alignment member distal portion lower surface 44*b* is adapted to engage a portion of the arcuate outer surface of an egg in generally mating relation therewith.

Figure 13:
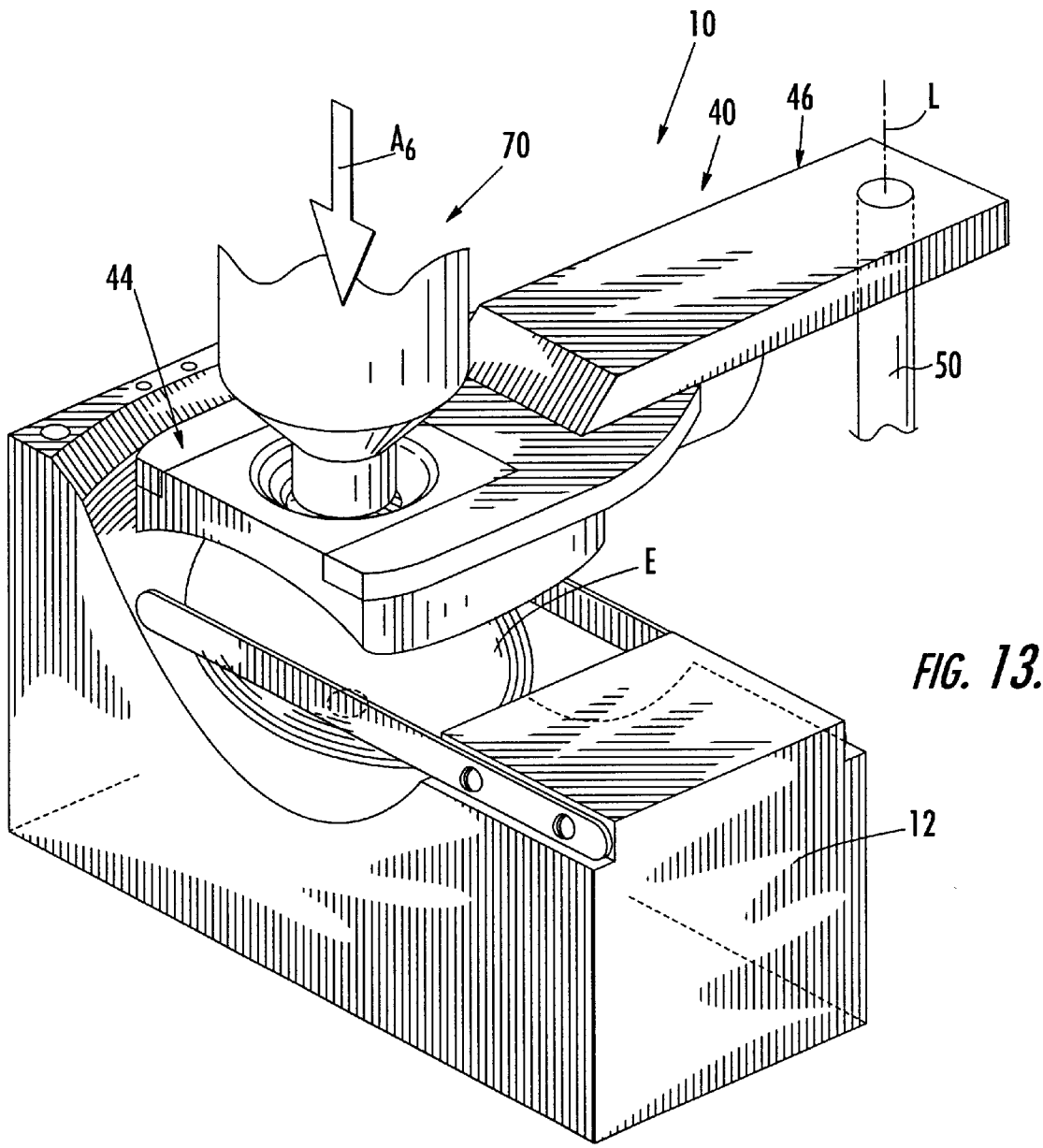
FIG. 13 is a perspective view of the egg positioning apparatus of FIG. 8 illustrating the injection/removal apparatus being lowered downwardly toward the egg such that an instrument can be inserted through the aperture in the alignment member and into the egg.
Figure 14:
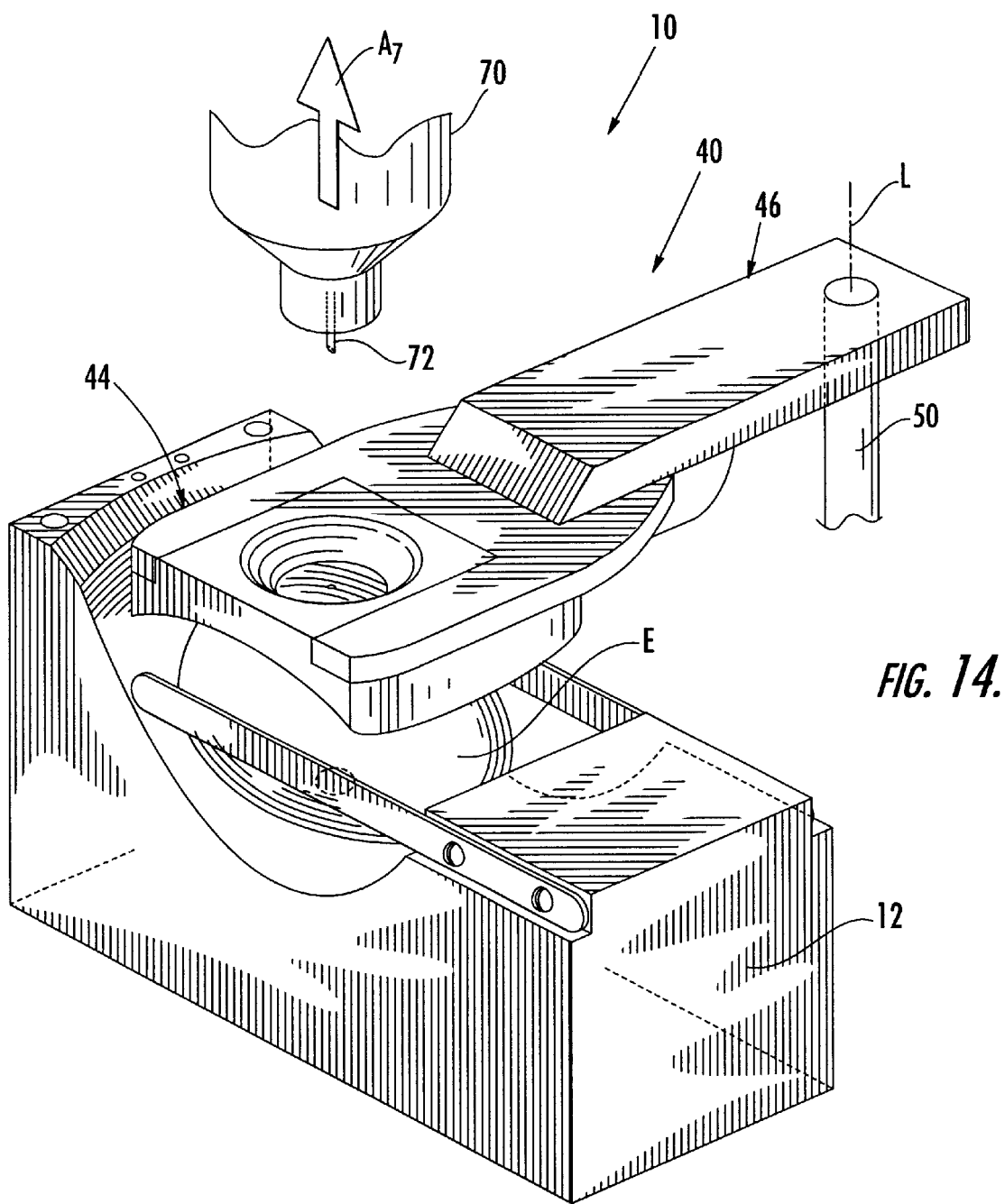
FIG. 14 is a perspective view of the egg positioning apparatus of FIG. 8 illustrating the injection/removal apparatus being raised upwardly from the egg.
Figure 15:
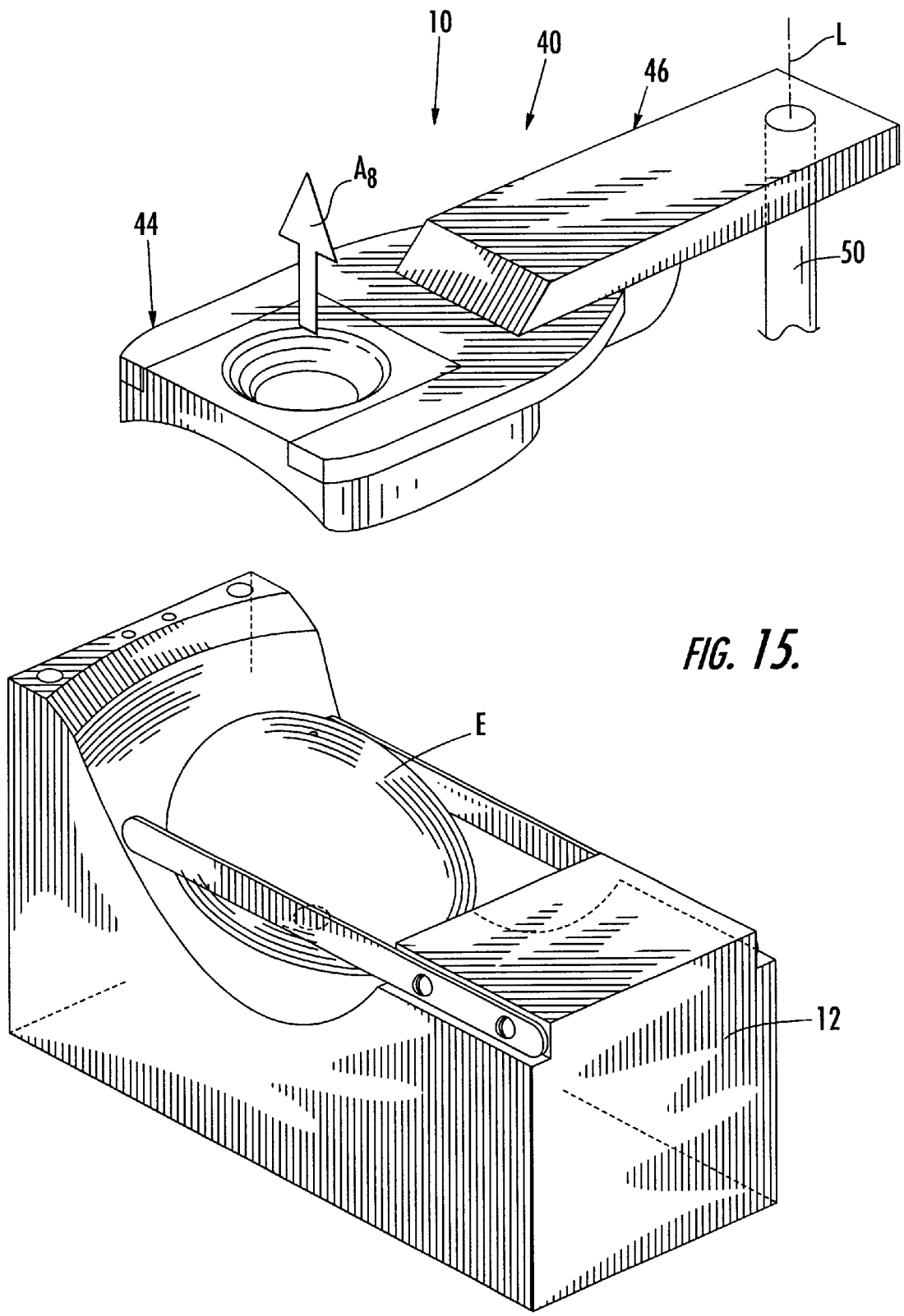
FIGS. 15–16 are perspective views of the egg positioning apparatus of FIG. 14 illustrating the alignment member being moved up and away from an egg placed within the apparatus.
Figure 16:
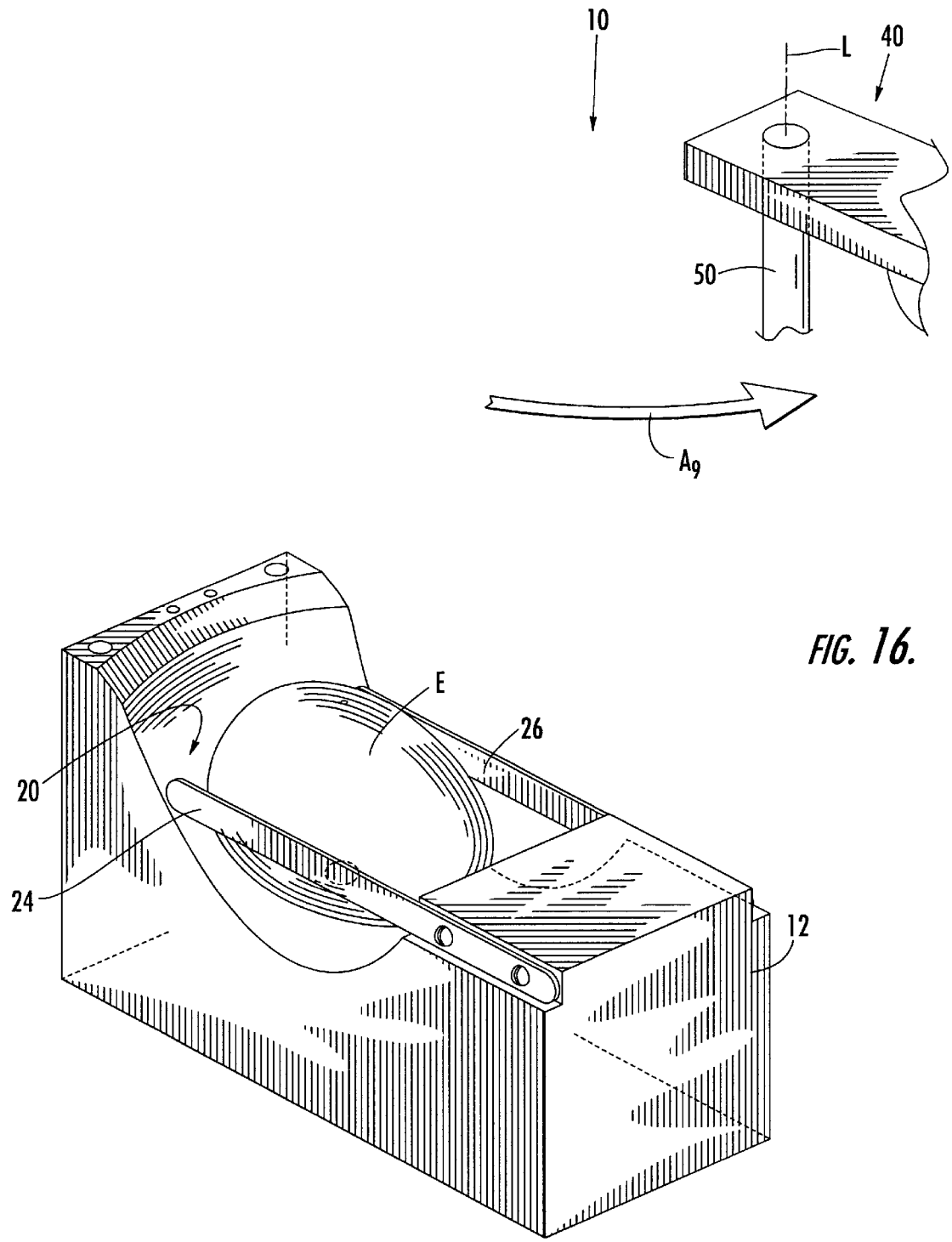
Figure 17:
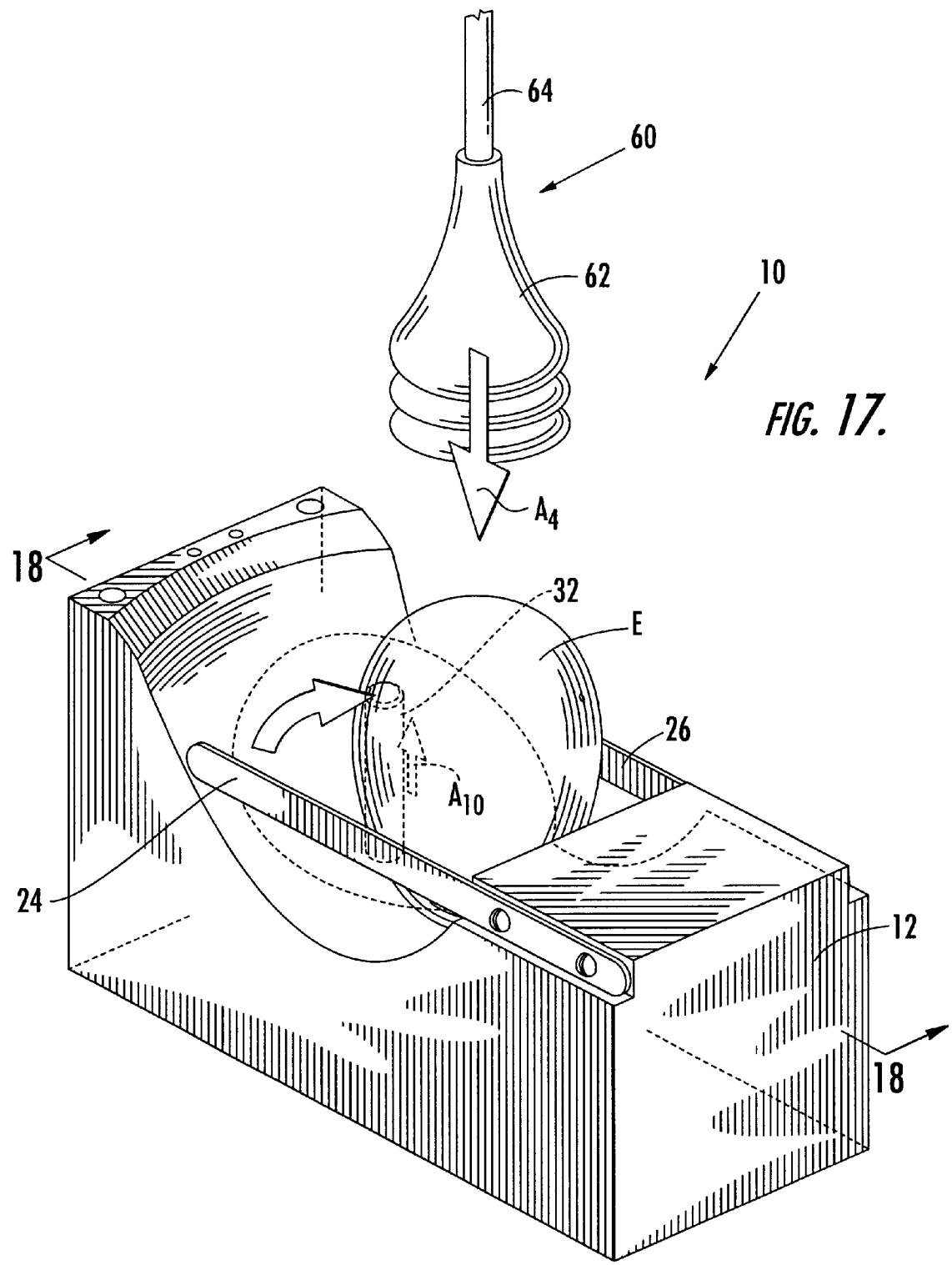
FIG. 17 is perspective view of the egg positioning apparatus of FIG. 14 illustrating the egg being urged to a generally vertical orientation by an orientation member and the transfer device moving downwardly to engage the reoriented egg.

Referring now to FIG. 13, an injection/removal device 70 has been lowered downwardly (indicated by arrow $A_6$) toward the egg E such that an instrument 72 (FIG. 14) can be inserted through the aperture 48 in the alignment member distal portion 44 and into the egg E. After injecting material into the egg E and/or removing material from the egg E, the injection/removal device 70 is raised upwardly (indicated by arrow $A_7$) away from the egg E, as illustrated in FIG. 14. The alignment member 40 is then raised upwardly (indicated by arrow $A_8$) away from the egg E (FIG. 15), and pivoted away (indicated by arrow $A_9$) about the longitudinal axis L of support 50.

Before the egg E can be removed from the cradle 12, the egg E is repositioned to a generally vertical orientation via the elongated rod 32 slidably positioned within the passageway 28 of the cradle 12. When moved to an extended position, illustrated in FIGS. 17 and 18, the elongated rod 32 extends upwardly (indicated by arrow $A_{10}$) along a generally vertical direction and pushes against the egg E to cause the egg E to move to a generally vertical orientation (i.e., such that the egg E is in an upright position on an end thereof). The retaining arms 24, 26 help guide and/or stabilize the egg E as it is urged to a generally vertical orientation by elongated rod 32. Moreover, the retaining arms 24, 26 help prevent the egg E from tipping to either side of the elongated rod 32 during operation thereof.

Figure 19:
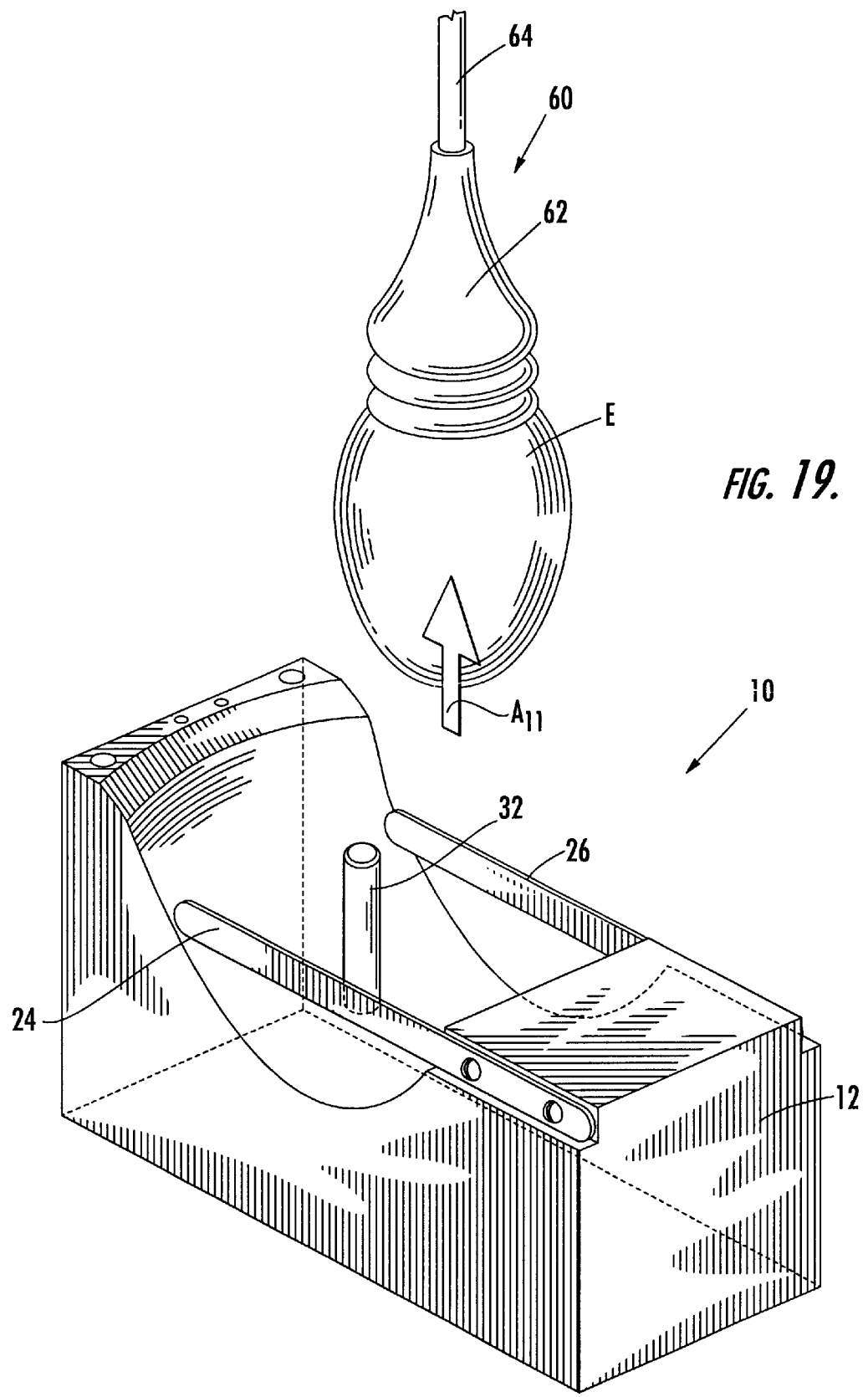
FIG. 19 is a perspective view of the egg positioning apparatus of FIG. 18 illustrating the egg being removed from the apparatus.

Once the egg E is repositioned to a generally vertical orientation, the transfer device 60 moves downwardly (indicated by arrow $A_4$) toward the upright egg E (FIG. 17), engages the egg and moves upwardly (indicated by arrow $A_{11}$) to remove the egg from the cradle (FIG. 19).

FIGS. 20–23 illustrate an egg positioning apparatus 10' that is configured to reposition an egg from a vertically oriented position to a horizontal position and then back to a vertically oriented position, according to an alternative embodiment of the present invention. The illustrated apparatus 10' includes a cradle 12' having first and second portions 120*a*, 120*b* that define a receptacle for receiving an egg. The illustrated first portion 120*a* has a pair of opposite, spaced-apart members 122, 124 with inclined upper ends 122*a*, 124*a*. Each inclined upper end 122*a*, 124*a* has an inwardly sloping surface 126, 128. The illustrated second portion 120*b* has a pair of opposite, spaced-apart members 132, 134 with inclined upper ends 132*a*, 134*a*. Each inclined upper end 132*a*, 134*a* has an inwardly sloping surface 136, 138.

The inclined upper ends 132*a*, 134*a* of the second portion 120*b* are configured to receive an end of a vertically oriented egg and to cause the egg to slide downwardly such that the egg becomes positioned on the first and second portions 120*a*, 120*b* in a generally inclined orientation. The configuration of the inclined upper ends 122*a*, 124*a*, 132*a*, 134*a* of the first and second portions 120*a*, 120*b* help maintain an egg in a generally centered position in the cradle 12'.

Figures 20, 21:
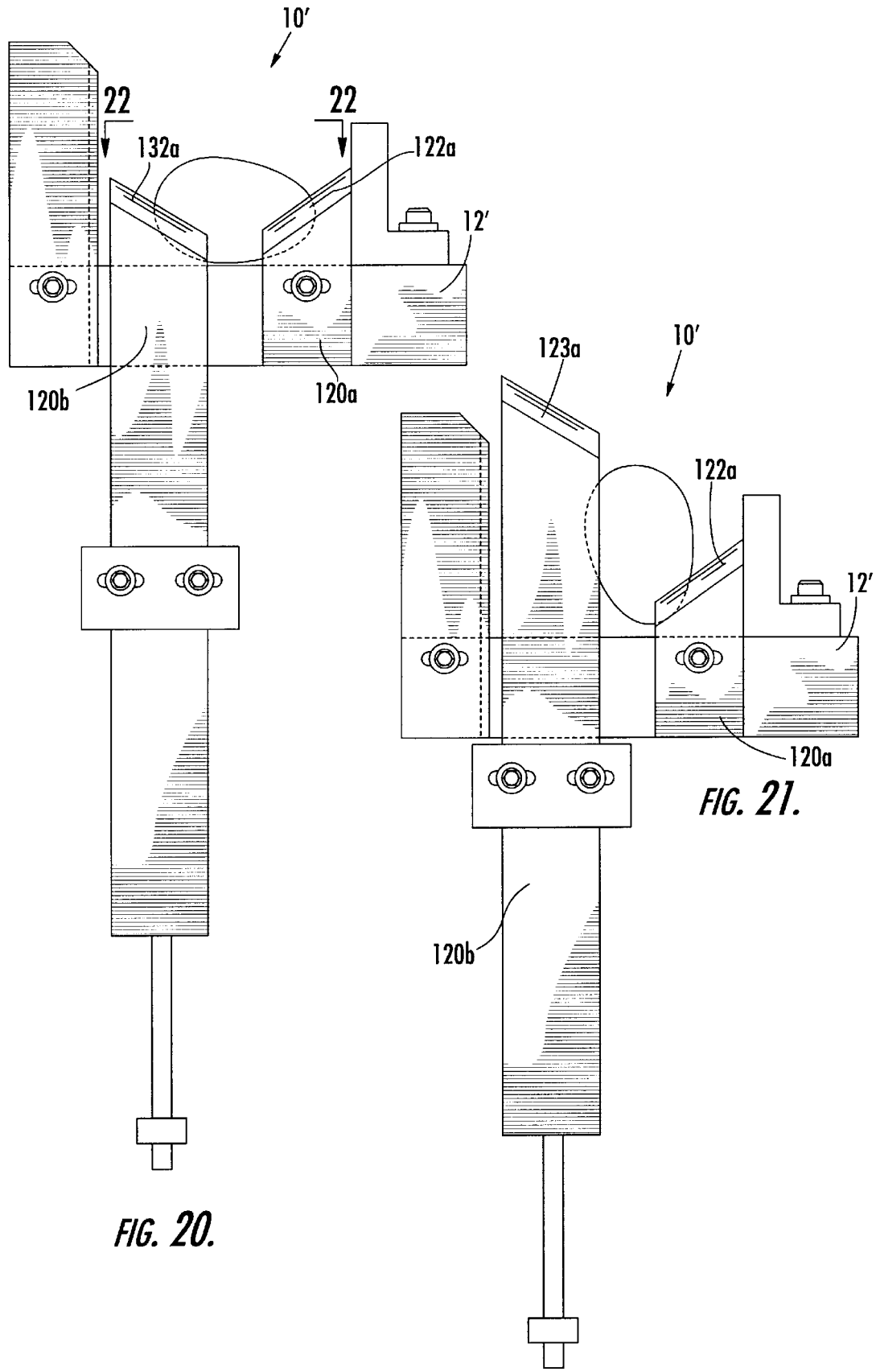
FIG. 20 is a side view of an egg positioning apparatus, according to alternative embodiments of the present invention, and wherein an egg is in a generally horizontal position therein.
FIG. 21 illustrates the egg positioning apparatus of FIG. 20, wherein the egg is being urged to a generally vertical orientation by an orientation member.
Figure 22:
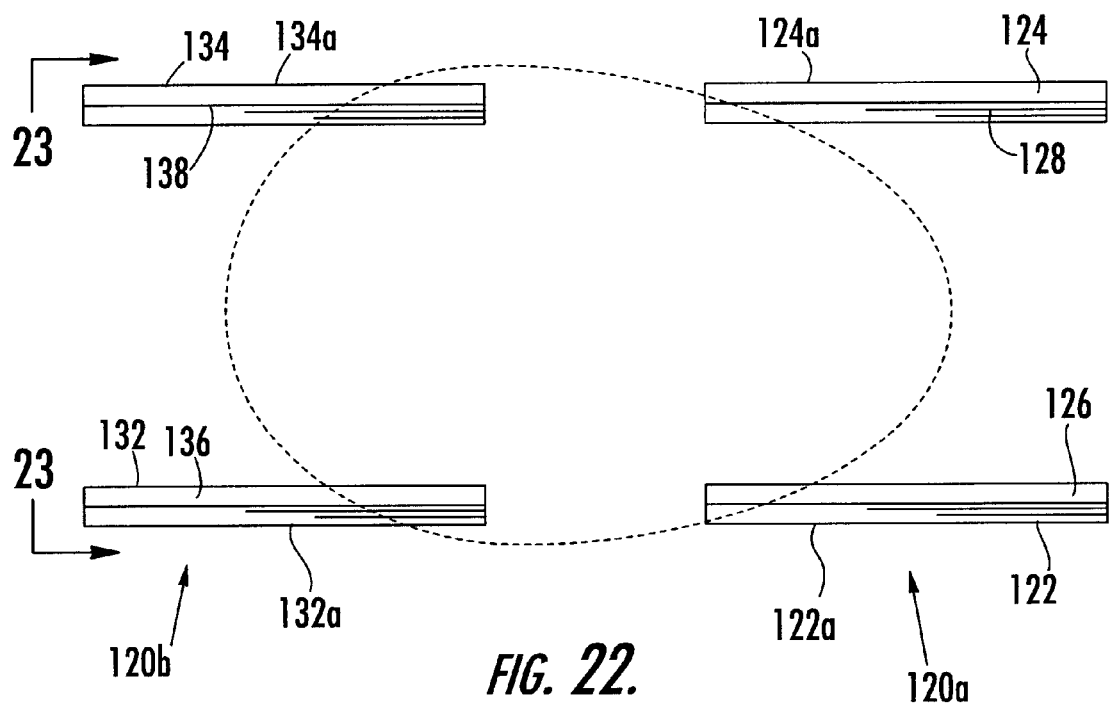
FIG. 22 is a partial top, plan view of the egg positioning apparatus of FIG. 20 taken along lines 22—22 and illustrating the inclined upper ends of the first and second portions.
Figure 23:
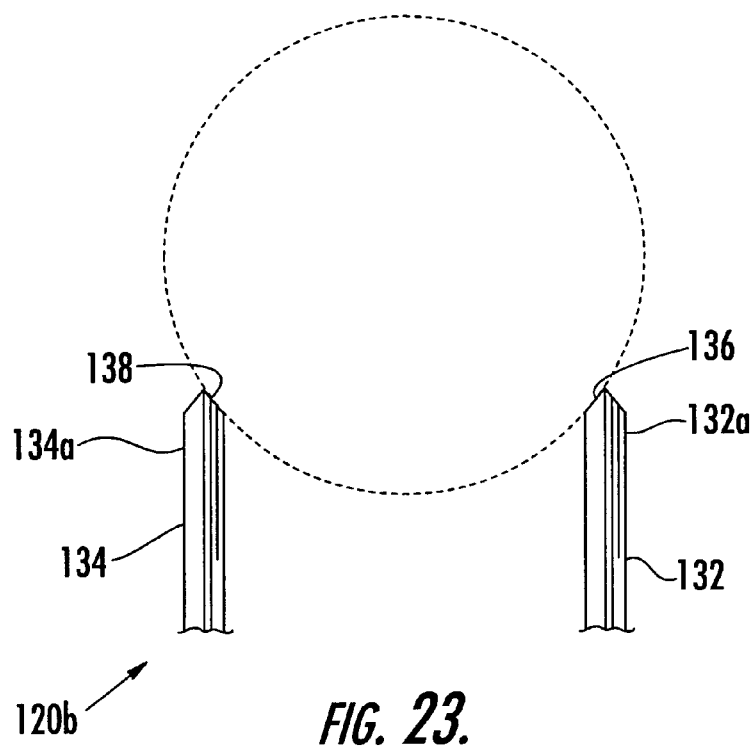
FIG. 23 is a partial end view of the egg positioning apparatus of FIG. 22 taken along lines 23—23.

The second portion 120*b* serves as an orientation member and is configured for reciprocal movement between a retracted position (FIG. 20) and an extended position (FIG. 21). In an extended position, the second portion 120*b* urges an egg horizontally positioned (or otherwise inclined relative to vertical) within the cradle 12' to a vertical orientation. Movement of the support second portion 120*b* is controlled by an actuator (not shown).

Typically an egg is removed from an egg carrier, such as an egg flat, placed in an egg positioning apparatus 10, 10' and removed therefrom and placed in the same or different egg carrier. Embodiments of the present invention may be utilized in conjunction with all types and configurations of egg handling systems, egg injection systems and systems for removing material from eggs.

Moreover, more than one egg positioning device in accordance with embodiments of the present invention may be utilized with egg handling systems, egg injection systems and systems for removing material from eggs. For example, a plurality of eggs may be transferred from an egg flat at the same time and placed within respective egg positions apparatus according to embodiments of the present invention.

Embodiments of the present invention are particularly adaptable for use with the Inovoject® egg injection system, available from Embrex, Inc. (Research Triangle Park, N.C.).

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. An apparatus for reorienting an egg from a generally vertical orientation to a generally horizontal orientation, comprising:
   a cradle having an inclined, arcuate surface with an upper portion, a lower portion, and opposite side portions, wherein the arcuate surface upper portion is configured to receive an end of a generally vertically oriented egg and to cause the egg to slide toward the lower portion such that the egg becomes positioned on the lower portion in an inclined orientation;
   an alignment member configured to engage an egg positioned on the arcuate surface lower portion in an inclined orientation and to releasably secure the egg in a predetermined alignment relative to the cradle;
   an orientation member operably associated with the cradle, wherein the orientation member is configured to urge an egg positioned on the lower portion in an inclined orientation to a generally vertical orientation; and
   a pair of retaining arms secured to the cradle in spaced-apart relation along the respective arcuate surface side portions.

2. The apparatus according to claim 1, further comprising an egg transfer device that is configured to deliver a generally vertically oriented egg to the arcuate surface upper portion.

3. The apparatus according to claim 2, wherein the egg transfer device is configured to remove a generally vertically oriented egg from the arcuate surface lower portion.

4. The apparatus according to claim 2, wherein the egg transfer device comprises:
   a flexible cup configured to engage and retain a generally vertically oriented egg in seated relation therewith when vacuum is provided within the flexible cup; and
   a vacuum source in communication with the flexible cup for providing vacuum within the flexible cup.

5. The apparatus according to claim 1, wherein the alignment member has an aperture formed therethrough and through which an instrument may pass for insertion within an egg secured by the alignment member.

6. The apparatus according to claim 5, wherein the alignment member has an arcuate configuration that is adapted for engagement with an egg in an inclined orientation.

7. The apparatus according to claim 1, wherein the orientation member comprises an elongated rod that is configured for reciprocal movement between a retracted position and an extended position, and wherein the orientation member, when extended, is configured to urge an egg positioned on the lower portion in an inclined orientation to a generally vertical orientation.

8. An apparatus for reorienting an egg from a generally vertical orientation to a generally horizontal orientation, comprising:
   a cradle having an inclined, arcuate surface with an upper portion, a lower portion, and opposite side portions, wherein the arcuate surface upper portion is configured to receive an end of a generally vertically oriented egg and to cause the egg to slide toward the lower portion such that the egg becomes positioned on the lower portion in an inclined orientation; and
   an orientation member operably associated with the cradle, wherein the orientation member is configured to urge an egg positioned on the lower portion in an inclined orientation to a generally vertical orientation, wherein the orientation member comprises an elongated rod that is configured for reciprocal movement between a retracted position and an extended position, and wherein the orientation member, when extended, is configured to urge an egg positioned on the lower portion in an inclined orientation to a generally vertical orientation.

9. The apparatus according to claim 8, further comprising an alignment member operably positioned adjacent the cradle that is configured to engage an egg positioned on the arcuate surface lower portion in an inclined orientation and to releasably secure the egg in a predetermined alignment relative to the cradle.

10. The apparatus according to claim 8, further comprising an egg transfer device that is configured to deliver a generally vertically oriented egg to the arcuate surface upper portion.

11. The apparatus according to claim 10, wherein the egg transfer device is configured to remove a generally vertically oriented egg from the arcuate surface lower portion.

12. The apparatus according to claim 10, wherein the egg transfer device comprises:
   a flexible cup configured to engage and retain a generally vertically oriented egg in seated relation therewith when vacuum is provided within the flexible cup; and
   a vacuum source in communication with the flexible cup for providing vacuum within the flexible cup.

13. The apparatus according to claim 8, wherein the alignment member has an aperture formed therethrough and through which an instrument may pass for insertion within an egg secured by the alignment member.

14. The apparatus according to claim 13, wherein the alignment member has an arcuate configuration that is adapted for engagement with an egg in an inclined orientation.

15. The apparatus according to claim 8, further comprising a pair of retaining arms secured to the cradle in spaced-apart relation along the respective arcuate surface side portions.

16. An apparatus for reorienting an egg from a generally vertical orientation to a generally horizontal orientation, comprising:
   a cradle having an inclined, arcuate surface with an upper portion, a lower portion, and opposite side portions, wherein the arcuate surface upper portion is configured to receive an end of a generally vertically oriented egg and to cause the egg to slide toward the lower portion such that the egg becomes positioned on the lower portion in an inclined orientation;

an alignment member operably associated with the cradle that is configured to engage an egg positioned on the arcuate surface lower portion in an inclined orientation and to releasably secure the egg in a predetermined alignment relative to the cradle;

an orientation member operably associated with the cradle, wherein the orientation member comprises an elongated rod that is configured for reciprocal movement between a retracted position and an extended position, and wherein the elongated rod, when extended, is configured to urge an egg positioned on the lower portion in an inclined orientation to a generally vertical orientation; and a pair of retaining arms secured to the cradle in spaced-apart relation along the respective arcuate surface side portions.

17. The apparatus according to claim 16, further comprising an egg transfer device that is configured to deliver a generally vertically oriented egg to the arcuate surface upper portion and to remove a generally vertically oriented egg from the arcuate surface lower portion.

18. The apparatus according to claim 16, wherein the alignment member has an aperture formed therethrough and through which an instrument may pass for insertion within an egg secured by the alignment member.

19. The apparatus according to claim 16, wherein the alignment member has an arcuate configuration that is adapted for engagement with an egg in an inclined orientation.

20. A method of reorienting an egg between generally vertical and generally horizontal orientations, comprising:

lowering a generally vertically oriented egg such that an end thereof contacts an inclined surface;

releasing the egg so that it takes an inclined orientation in contact with the inclined surface;

contacting the egg with an alignment member that moves the egg from the inclined orientation to a generally horizontal orientation on a floor surface adjacent the inclined surface;

removing the alignment member from contacting relation with the egg; and contacting the egg in the generally horizontal orientation with an elongated rod that is configured for reciprocal movement between a retracted position and an extended position, wherein the elongated rod extends to the extended position to urge the egg to a generally vertical orientation.

21. An apparatus for reorienting an egg from a generally vertical orientation to a generally horizontal orientation, comprising:

a cradle having a first portion, and an adjacent, spaced-apart second portion;

wherein the first portion comprises a pair of opposite, spaced-apart members with inclined upper ends;

wherein the second portion comprises a pair of opposite, spaced-apart members with inclined upper ends;

wherein the inclined upper ends of the second portion are configured to receive an end of a vertically oriented egg and to cause the egg to slide downwardly such that the egg becomes positioned on the upper ends of the first and second portions in a generally inclined orientation; and wherein the second portion is configured for reciprocal movement between a retracted position and an extended position, and wherein the second portion is configured to urge an egg positioned on the upper ends of the first and second portions to a generally vertical orientation when the second portion is moved to the extended position.

22. The apparatus according to claim 21, wherein the inclined upper ends of the first portion comprise inwardly sloping surfaces.

23. The apparatus according to claim 21, wherein the inclined upper ends of the second portion comprise inwardly sloping surfaces.

24. The apparatus according to claim 21, further comprising an egg transfer device that is configured to deliver a generally vertically oriented egg to the inclined upper ends of the second portion.

25. The apparatus according to claim 24, wherein the egg transfer device is configured to remove a generally vertically oriented egg from the cradle.

26. The apparatus according to claim 24, wherein the egg transfer device comprises:

a flexible cup configured to engage and retain a generally vertically oriented egg in seated relation therewith when vacuum is provided within the flexible cup; and a vacuum source in communication with the flexible cup for providing vacuum within the flexible cup.

* * * * *